United States Patent
Kusaka

(10) Patent No.: US 8,111,310 B2
(45) Date of Patent: Feb. 7, 2012

(54) IMAGE SENSOR AND IMAGE-CAPTURING DEVICE

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 663 days.

(21) Appl. No.: 12/292,678

(22) Filed: Nov. 24, 2008

(65) Prior Publication Data

US 2009/0135273 A1 May 28, 2009

Related U.S. Application Data

(60) Provisional application No. 60/996,677, filed on Nov. 29, 2007.

(30) Foreign Application Priority Data

Nov. 28, 2007 (JP) ................................. 2007-307384

(51) Int. Cl.
*H04N 3/14* (2006.01)
*H04N 5/335* (2006.01)

(52) U.S. Cl. ........ 348/294; 348/302; 348/335; 348/340; 348/343; 348/344; 348/345; 348/349; 348/350

(58) Field of Classification Search .................. 348/294, 348/302, 335, 340, 343–345, 349, 350, 218.1, 348/228.1, 230.1, 236, 245, 272.281
See application file for complete search history.

(56) References Cited

U.S. PATENT DOCUMENTS

| 6,829,008 | B1 | 12/2004 | Kondo et al. | |
|---|---|---|---|---|
| 6,831,692 | B1 * | 12/2004 | Oda | 348/315 |
| 7,715,703 | B2 * | 5/2010 | Utagawa et al. | 348/345 |
| 2003/0231251 | A1 * | 12/2003 | Tsukioka | 348/272 |
| 2004/0125230 | A1 * | 7/2004 | Suda | 348/345 |
| 2006/0092313 | A1 * | 5/2006 | Kimura | 348/345 |
| 2006/0170794 | A1 * | 8/2006 | Higuchi et al. | 348/241 |
| 2007/0115377 | A1 * | 5/2007 | Noda et al. | 348/294 |
| 2009/0096886 | A1 * | 4/2009 | Kusaka | 348/345 |
| 2009/0135289 | A1 * | 5/2009 | Kusaka | 348/345 |

FOREIGN PATENT DOCUMENTS

JP    A-2000-156823    6/2000

* cited by examiner

*Primary Examiner* — Evelyn A. Lester
(74) *Attorney, Agent, or Firm* — Oliff & Berridge, PLC

(57) ABSTRACT

An image sensor includes: a plurality of first pixels that receive a light flux having passed through an optical system and output pixel signals to be used as image signals; a plurality of second pixels that receive a light flux having passed through the optical system and output pixel signals to be used as signals other than the image signals; a plurality of first pixel rows, each of which includes an array made up with a plurality of first pixels; at least one second pixel row that includes an array made up with first pixels and second pixels; an output circuit that outputs a read signal in response to which pixel signals output at the first pixels are read out from the first pixel rows over first pixel intervals and pixel signals output at the second pixels are read out from the second pixel row over second pixel intervals, different from the first pixel intervals, the output circuit outputting externally the pixel signals having been read out; and a switching device that selects a specific pixel row, either one of the first pixel rows or the second pixel row, from which pixel signals are to be read out by the output circuit.

14 Claims, 29 Drawing Sheets

13　10
　└─┬─┘
　　313

10　14
　└─┬─┘
　　314

FIRST FIELD

SECOND FIELD

IMAGE SENSOR AND IMAGE-CAPTURING DEVICE

This non-provisional application claims the benefit of U.S. Provisional Patent Application No. 60/996,677 filed Nov. 29, 2007. This application also claims priority from Japanese Patent Application No. 2007-307384 filed Nov. 28, 2007. The disclosure of each of the earlier applications is incorporated herein by reference in its entirety.

BACKGROUND OF THE INVENTION

1. Field of the Invention

The present invention relates to an image sensor made up of imaging pixels and focus detection pixels and an image-capturing device equipped with this image sensor.

2. Description of Related Art

Japanese Laid Open Patent Publication No. 2000-156823 discloses an image-capturing device that captures an image and also executes focus detection via an image sensor that includes focus detection pixels instead of some imaging pixels disposed among two-dimensionally arrayed imaging pixels.

SUMMARY OF THE INVENTION

At the imaging image-capturing device in the related art mentioned above, EVF (electronic viewfinder) display (live view display of through images) is provided based upon signals read out through a sub-sampling read by skipping some lines on the image sensor. In order to execute the live view display and focus detection operation concurrently, a read mode for the live view display and a range-finding read mode for focus detection, in which signals at the focus detection pixels are read out, must be engaged separately and independently of each other through time-sharing.

However, when the image-capturing device is cyclically engaged in operation in the live view display read mode with the range-finding read mode selected over intervals so that each focus detection signal read is executed following a plurality of image information read operation cycles for the live view display, some dead time or a dead frame is bound to occur while the operation mode (a sub-sampling read mode or a summing mode) setting for the scanning circuit of the image sensor is switched. This, in turn, will lead to a disruption of the live view display image information read cycles, causing instability in the live view display image.

According to the 1st aspect of the present invention, an image sensor comprises: a plurality of first pixels that receive a light flux having passed through an optical system and output pixel signals to be used as image signals; a plurality of second pixels that receive a light flux having passed through the optical system and output pixel signals to be used as signals other than the image signals; a plurality of first pixel rows, each of which includes an array made up with a plurality of first pixels; at least one second pixel row that includes an array made up with first pixels and second pixels; an output circuit that outputs a read signal in response to which pixel signals output at the first pixels are read out from the first pixel rows over first pixel intervals and pixel signals output at the second pixels are read out from the second pixel row over second pixel intervals, different from the first pixel intervals, the output circuit outputting externally the pixel signals having been read out; and a switching device that selects a specific pixel row, either one of the first pixel rows or the second pixel row, from which pixel signals are to be read out by the output circuit.

According to the 2nd aspect of the present invention, in the image sensor according to the 1st aspect, it is preferred that the image sensor further comprises a selector that selects a circuit via which the read signal is manipulated in correspondence to the specific pixel row from which the output circuit is to read out pixel signals; and line memories that read out and hold pixel signals from each of the first pixel rows and the second pixel row.

According to the 3rd aspect of the present invention, in the image sensor according to the 1st aspect, it is preferred that the first pixels each receive a light flux having passed through the optical system substantially over an entire range of a pupil thereof; and the second pixels each receive a light flux having passed through the optical system over a partial area in the pupil thereof.

According to the 4th aspect of the present invention, in the image sensor according to the 3rd aspect, it is preferred that the second pixels are focus detection pixels each equipped with a micro lens and a first photoelectric conversion unit that receives the light flux via the micro lens; and first focus detection pixels and second focus detection pixels that receive light fluxes having passed through different partial areas of the pupil are disposed alternately to each other.

According to the 5th aspect of the present invention, in the image sensor according to the 2nd aspect, it is preferred that the image sensor further comprises: a first output circuit and a second output circuit constituting the output circuit, which respectively output a first read signal and a second read-signal to the line memories. The selector selects either the first output circuit or the second output circuit depending upon the specific pixel row from which pixel signals are to be read out by the output circuit.

According to the 6th aspect of the present invention, in the image sensor according to the 2nd aspect, it is preferred that the image sensor further comprises: a signal line through which the read signal is output from the output circuit to the line memories. The selector selects the signal line in order to manipulate the read signal into a first read signal or a second read signal assuming cycles different from cycles of the first read signal, depending upon the specific pixel row from which pixel signals are to be read out by the output circuit.

According to the 7th aspect of the present invention, in the image sensor according to the 2nd aspect, it is preferred that the selector adjusts cycles of the read signal when the output circuit is to read out pixel signals from the second pixel row.

According to the 8th aspect of the present invention, in the image sensor according to the 2nd aspect, it is preferred that if a first read signal is input to the line memories, pixel signals at the first pixels are read out sequentially over predetermined intervals set as the first pixel intervals, whereas if a second read signal is input to the line memories, pixel signals at the second pixels set in succession are sequentially read out consecutively with no intervals set as the second pixel intervals, and the output circuit outputs the pixel signals thus read out externally.

According to the 9th aspect of the present invention, an image-capturing device comprises: an image sensor according to the 1st aspect; a read circuit that cyclically reads out the pixel signals output from the output circuit; a display controller that displays an image based upon pixel signals having been first read out from the first pixel rows by the output circuit in response to the read signal and then read out by the read circuit; and a focus detector that detects a focusing condition of the optical system based upon pixel signals having been first read out from the second pixel row by the output circuit in response to the read signal and then read out by the read circuit.

According to the 10th aspect of the present invention, in the image-capturing device according to the 9th aspect, it is preferred that the display controller generates image signals at positions occupied by the second pixels through interpolation executed based upon pixel signals output from the first pixels present near the second pixels.

According to the 11th aspect of the present invention, in the image-capturing device according to the 9th aspect, it is preferred that the image-capturing device further comprises: a focus adjuster that executes focus adjustment for the optical system based upon the focusing condition.

According to the 12th aspect of the present invention, an image sensor comprises: a plurality of first pixels that receive a light flux having passed through an optical system and output pixel signals to be used as image signals; a plurality of second pixels that receive a light flux having passed through the optical system and output pixel signals to be used as signals other than image signals; a plurality of first pixel rows, each of which includes an array made up with a plurality of first pixels; at least one second pixel row that includes an array made up with first pixels and second pixels and is set among the plurality of first pixel rows; an output circuit that assumes a first read mode or a second read mode. The output circuit outputs pixel signals at the first pixels, obtained in specific first pixel rows present over predetermined row intervals among the plurality of pixel rows in the first read mode; and the output circuit outputs pixel signals at the first pixels and the second pixels, obtained by replacing at least one of the specific first pixel rows with the second pixel row, in the second read mode.

According to the 13th aspect of the present invention, an image-capturing device comprises: an image sensor according to the 12th aspect; a read circuit that cyclically reads out the pixel signals output from the output circuit; a display controller that displays an image based upon pixel signals at the first pixels read out by the read circuit; and a focus detector that detects a focusing condition of the optical system based upon pixel signals at the second pixels read out by the read circuit. The output circuit is invariably engaged in operation in the second read mode in response to an image display instruction.

According to the 14th aspect of the present invention, in the image-capturing device according to the 13th aspect, it is preferred that the display controller generates image signals at positions occupied by the second pixels through interpolation executed based upon pixel signals output from the first pixels present near the second pixels.

DESCRIPTION OF PREFERRED EMBODIMENTS

The following is a description of the best mode for carrying out the present invention, given in reference to the drawings. In the following description, the image sensor and the image-capturing device according to the present invention are embodied in a digital still camera mounted with an interchangeable lens.

First Embodiment

Figure 1:
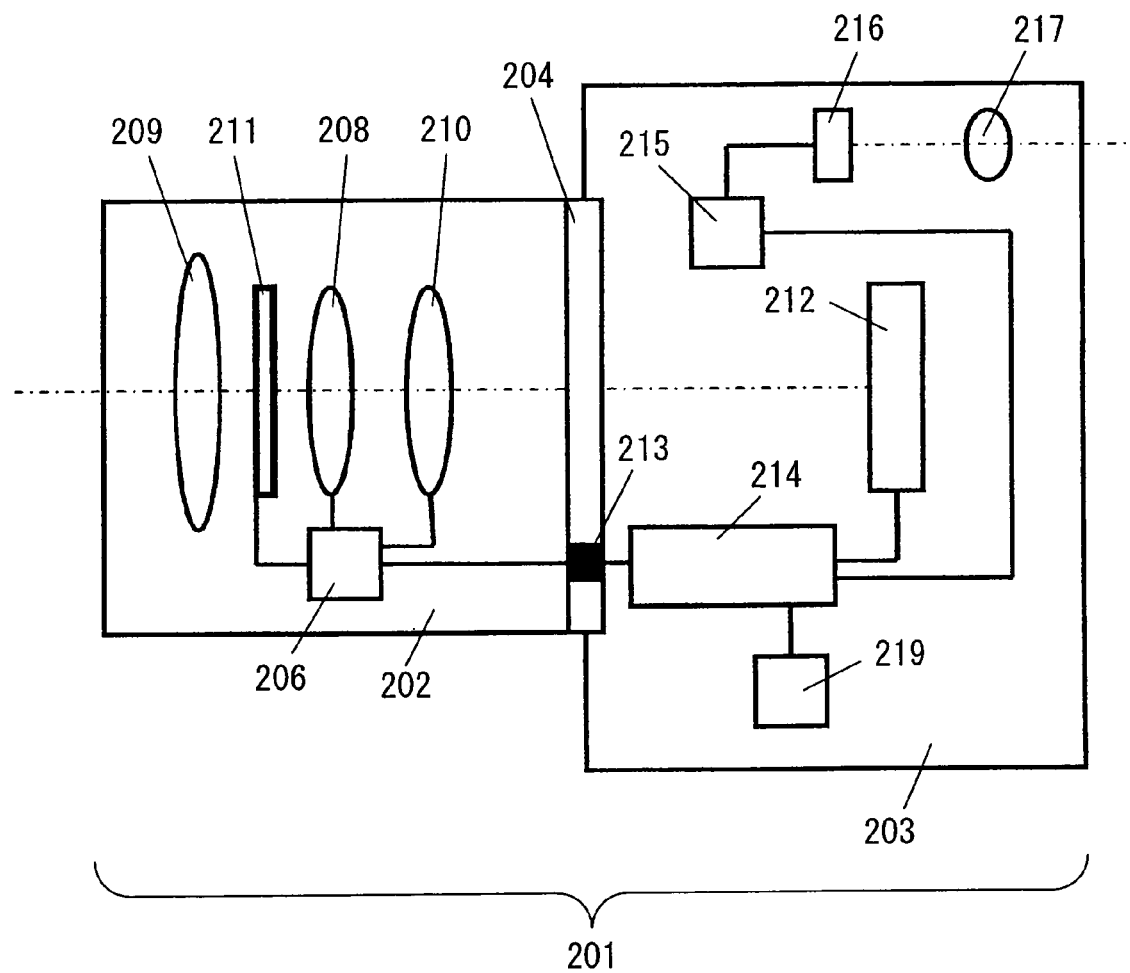
FIG. 1 is a lateral sectional view illustrating the structure of a digital still camera achieved in an embodiment of the present invention.

FIG. 1 is a lateral sectional view of a digital still camera, schematically illustrating the structure adopted in the digital still camera. A digital still camera 201 comprises an interchangeable lens 202 and a camera body 203. The interchangeable lens 202 is mounted at the camera body 203 via a mount unit 204. Interchangeable lenses constituted with various photographic optical systems can be mounted at the camera body 203 via the mount unit 204.

The interchangeable lens 202 includes a lens 209, a zooming lens 208, a focusing lens 210, an aperture 211 and a lens drive control device 206. The lens drive control device 206 is constituted with a microcomputer, a memory, a drive control circuit and the like (none shown). It engages in communication with a body drive control device 214 to be detailed later to transmit lens information to the body drive control device 214 and receive camera information from the body drive control device 214, as well as executing drive control to adjust the focus of the focusing lens 210 and adjust the opening diameter at the aperture 211 and detecting the states of the zooming lens 208, the focusing lens 210 and the aperture 211. The aperture 211 forms an opening with an adjustable diameter centered on the optical axis in order to adjust the light quantity and the extent of blur.

An image sensor 212, the body drive control device 214, a liquid crystal display element drive circuit (display controller) 215, a liquid crystal display element 216, an eyepiece lens 217, a memory card 219 and the like are disposed at the camera body 203. Imaging pixels are two-dimensionally arrayed at the image sensor 212 and focus detection pixels are also built into the image sensor 212 over an area corresponding to a focus detection position.

The body drive control device 214 comprises a microcomputer, a memory, a drive control circuit and the like. It repeatedly executes drive control of the image sensor 212, reads out image signals and focus detection signals, executes focus detection calculation based upon the focus detection signals and adjusts the focusing condition of the interchangeable lens 202. It also processes the image signals, records the processed image signals, controls camera operations and the like. In addition, the body drive control device 214 engages in communication with the lens drive control device 206 via an electrical contact point 213 to receive the lens information and transmit the camera information (indicating the defocus amount, the aperture value and the like).

The liquid crystal display element 216 functions as an EVF (electronic viewfinder). A through image provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light-receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus amount indicating the defocus amount based upon the focus detection signals output from the focus detection pixels at the image sensor 212 and transmits this defocus amount to the lens drive control device 206. In addition, the body drive control device 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211.

The lens drive control device 206 adjusts the lens information in correspondence to the current focusing state, zooming state and aperture setting state, the maximum aperture F number and the like. More specifically, it detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive control device 206 calculates a lens drive quantity indicating the extent to which the lens is to be driven based upon the defocus amount having been received and drives the focusing lens 210 to a focusing position based upon the lens drive quantity. The lens drive control device 206 also drives the aperture 211 in correspondence to the aperture value it has received.

Figure 2:
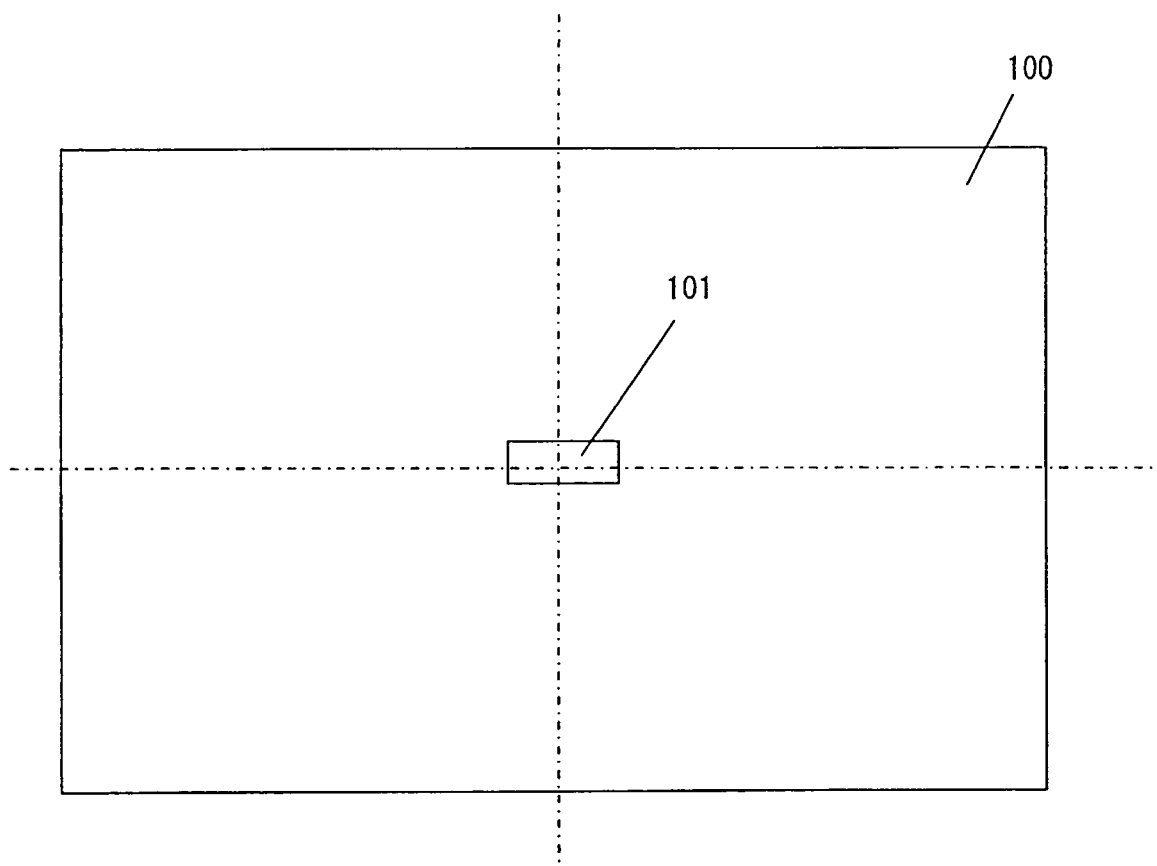
FIG. 2 shows a focus detection position assumed on the photographic image plane.

FIG. 2 shows a focus detection position taken on the photographic image plane, at which an image is sampled on the photographic image plane for focus detection via a focus detection pixel row to be detailed later (focus detection area, focus detection position). In the embodiment, a focus detection area 101 is set at the center within a rectangular photographic image plane 100. A plurality of focus detection pixels are arrayed in a straight line along the longer side of the rectangular focus detection area 101.

Figure 3:
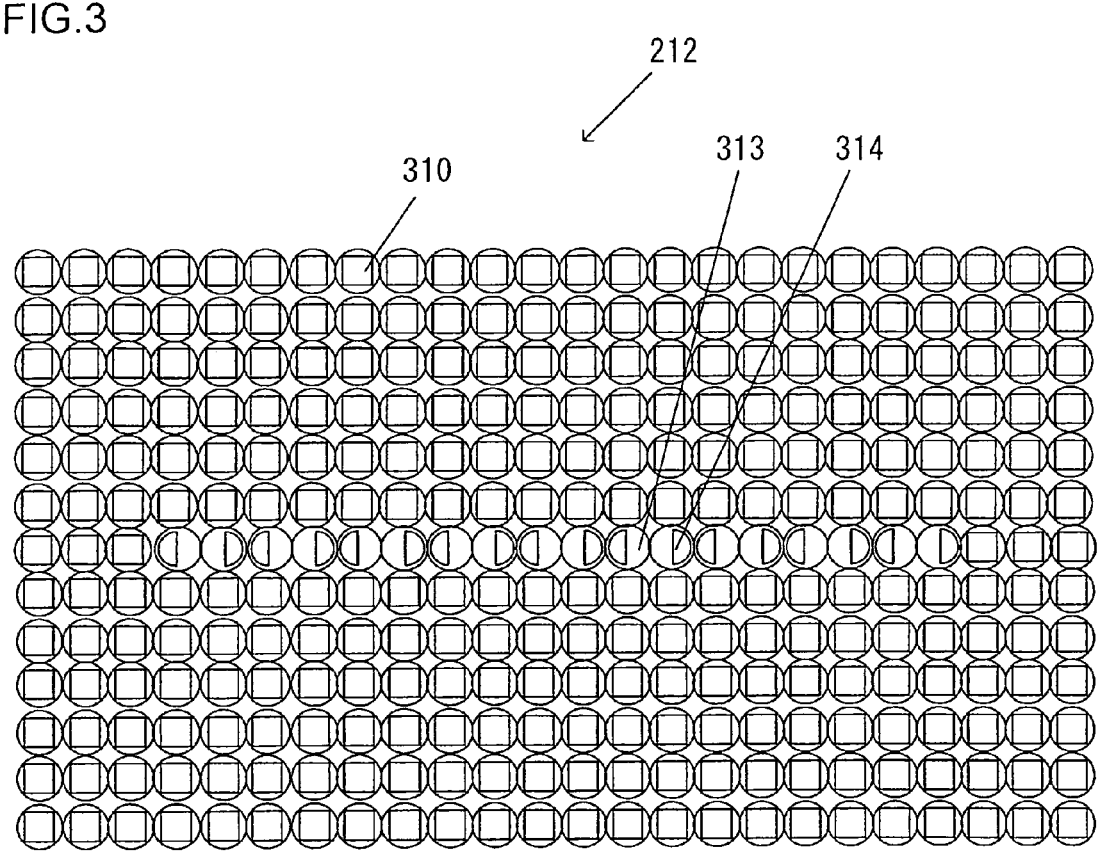
FIG. 3 is a front view showing in detail the structure of the image sensor.

FIG. 3 is a front view showing in detail the structure adopted in the image sensor 212, in an enlargement of the vicinity of the focus detection area 101 on the image sensor 212. The image sensor 212 is constituted with imaging pixels 310 and focus detection pixels 313 and 314. While the imaging pixels 310 are two-dimensionally arrayed along the horizontal direction and the vertical direction in a square grid array, the focus detection pixels 313 and 314 are disposed along the horizontal direction.

Figure 4:
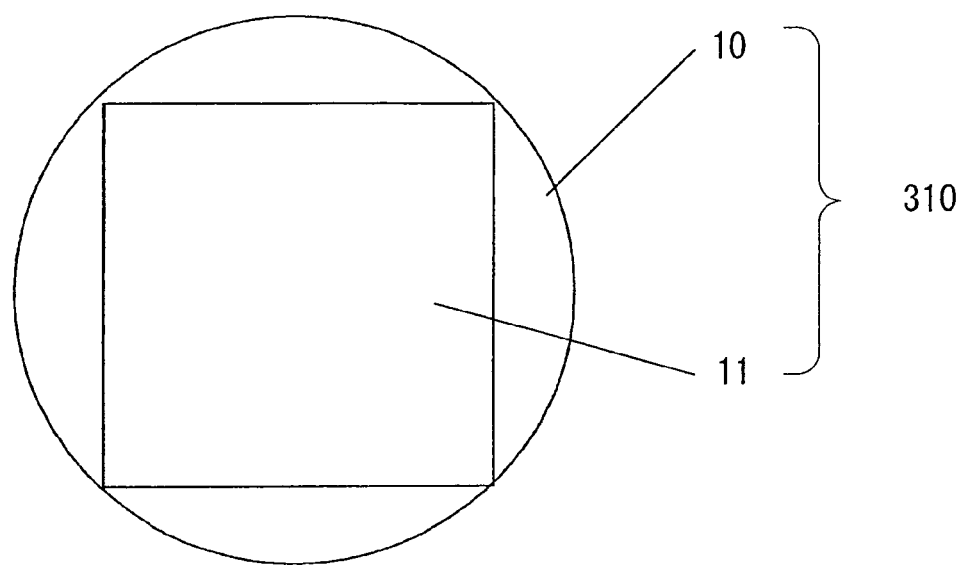
FIG. 4 is a front view showing in detail an imaging pixel.
Figure 5A:
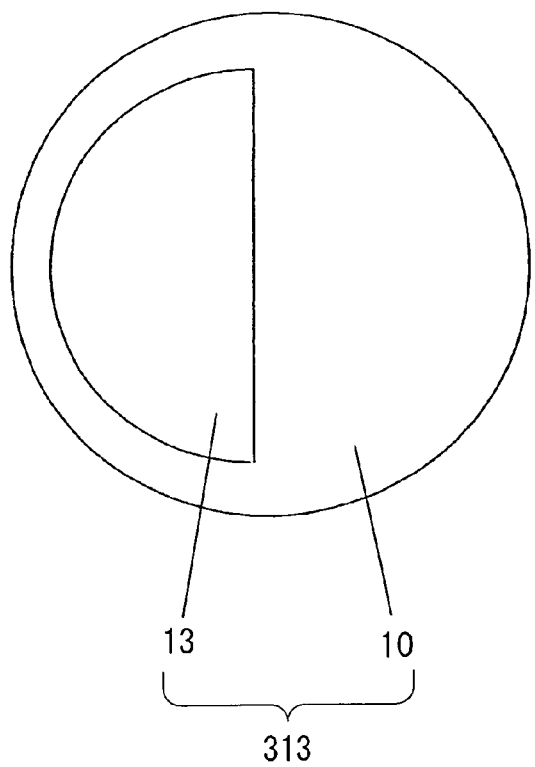
FIGS. 5A and 5B each present a front view showing in detail a focus detection pixel.
Figure 5B:
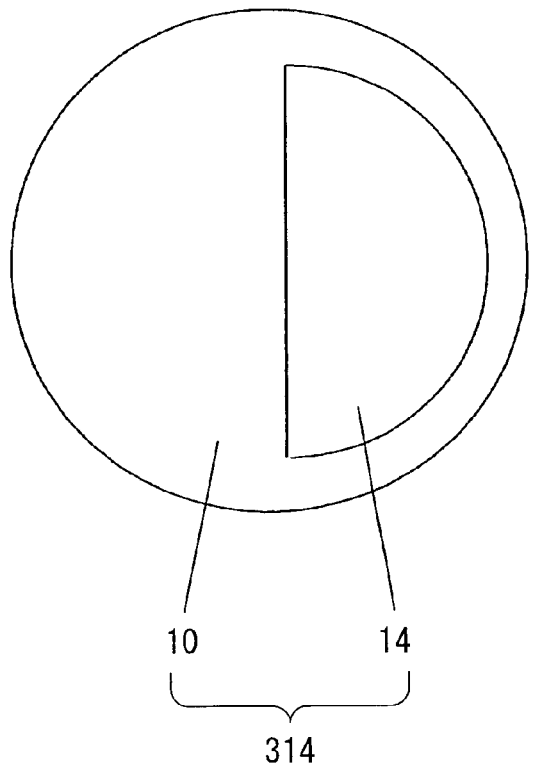

As shown in FIG. 4, the image in pixels 310 each include a micro lens 10 and a photoelectric conversion unit 11. The focus detection pixels 313 each include a micro lens 10 and a photoelectric conversion unit 13, as shown in FIG. 5A. The photoelectric conversion unit 13 assumes the shape of a semicircle in contact with the vertical bisector of the micro lens 10 on the left side. The focus detection pixels 314 each include a micro lens 10 and a photoelectric conversion unit 14, as shown in FIG. 5B. The photoelectric conversion unit 14 assumes the shape of a semicircle in contact with the vertical bisector of the micro lens 10 on the right side.

Figure 6:
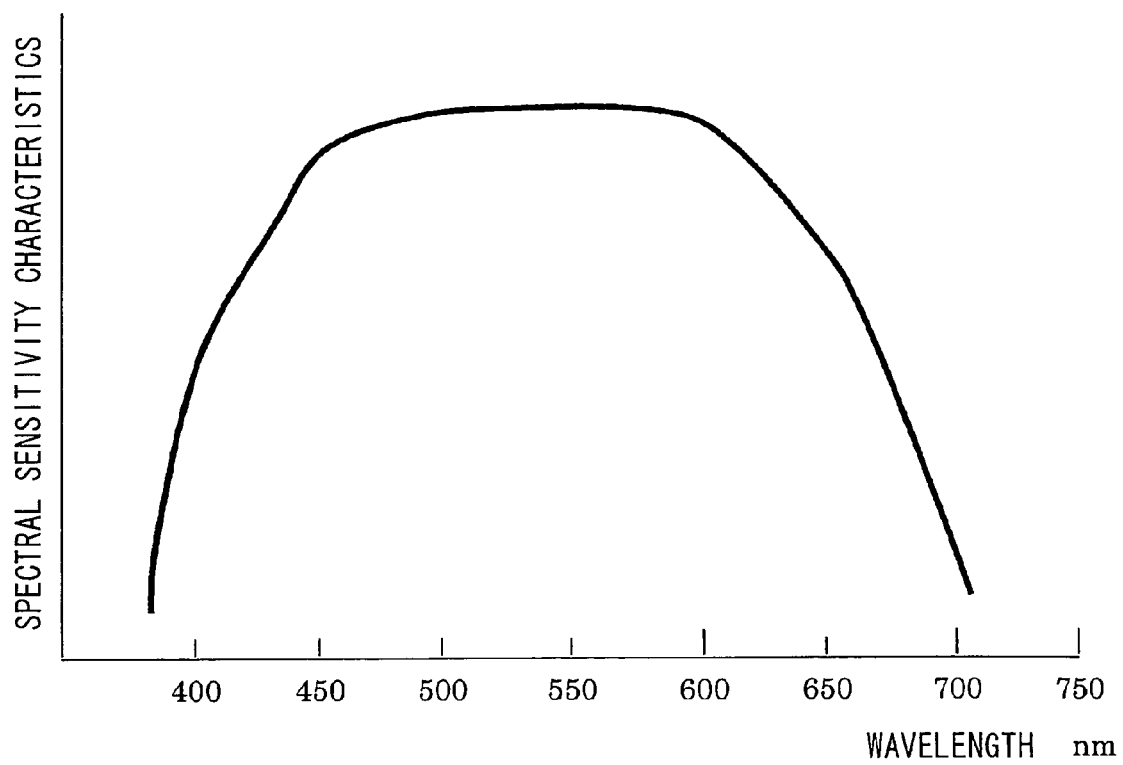
FIG. 6 shows the spectral sensitivity characteristics of the imaging pixels and the focus detection pixels.

The photoelectric conversion units 13 and 14 should range side-by-side along the horizontal direction if their micro lenses 10 were super posed on each other, in symmetry relative to the vertical bisector of the micro lenses 10. The focus detection pixels 313 and 314 are disposed alternately along the horizontal direction (the direction in which the photoelectric conversion units 13 and 14 are set side by side). The imaging pixels 310 and the focus detection pixels 313 and 314 structured as described above have spectral sensitivity characteristics such as those shown in FIG. 6.

Figure 7:
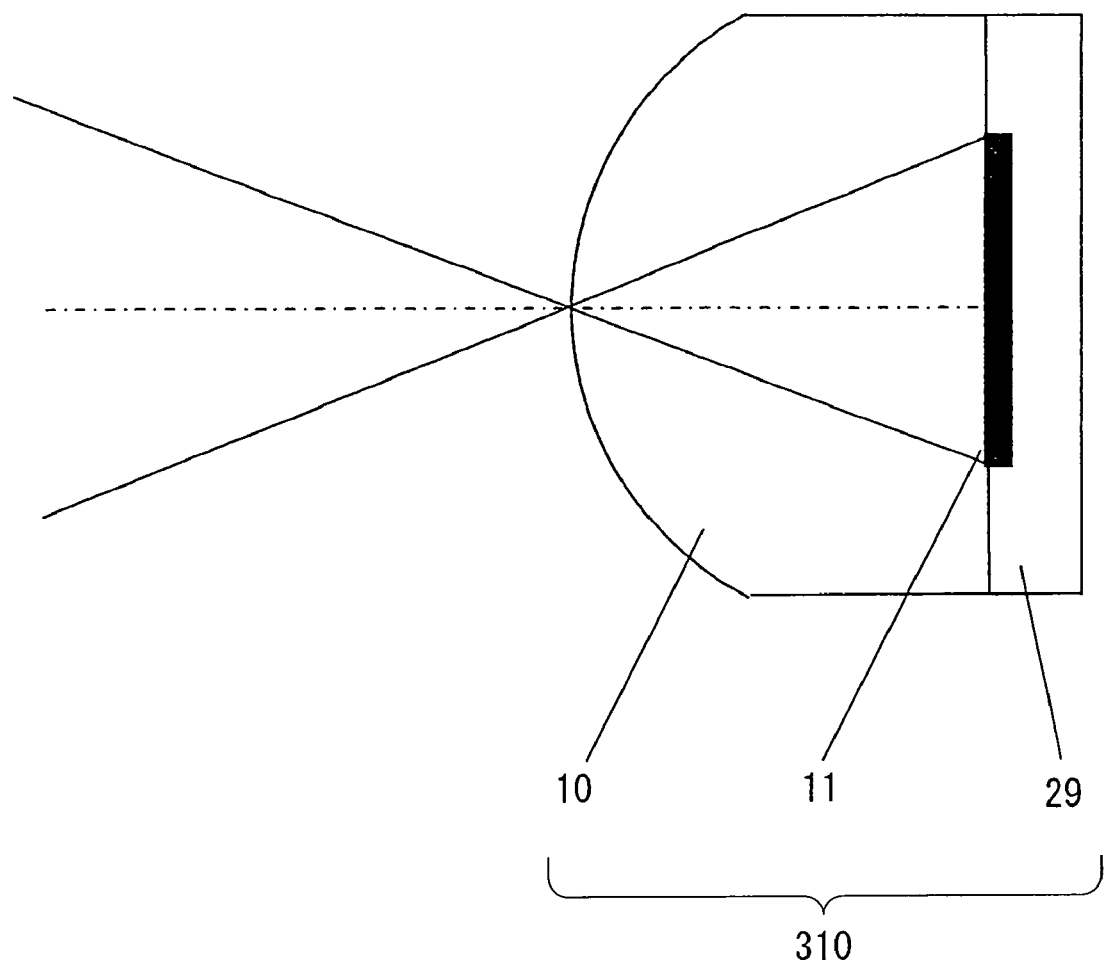
FIG. 7 is a sectional view of an imaging pixel.

FIG. 7 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29.

Figure 8A:
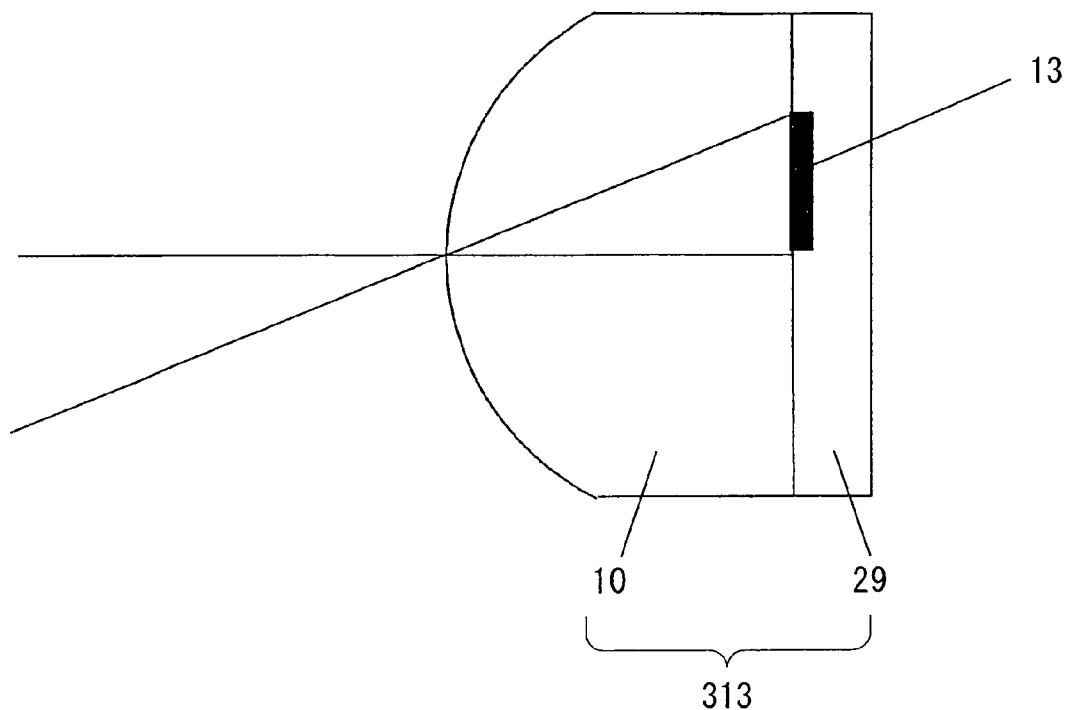
FIGS. 8A and 8B each present a sectional view of a focus detection pixel.

FIG. 8A is a sectional view of a focus detection pixel 313. At the focus detection pixel 313, the micro lens 10 is disposed to the front of the photoelectric conversion unit 13 and an image of the photoelectric conversion unit 13 is projected frontward via the micro lens 10. The photoelectric conversion unit 13 is formed on the semiconductor circuit substrate 29, with the micro lens 10 fixed as an integrated part thereof through a semiconductor image sensor manufacturing process. The photoelectric conversion unit 13 is disposed on one side of the optical axis of the micro lens 10.

Figure 8B:
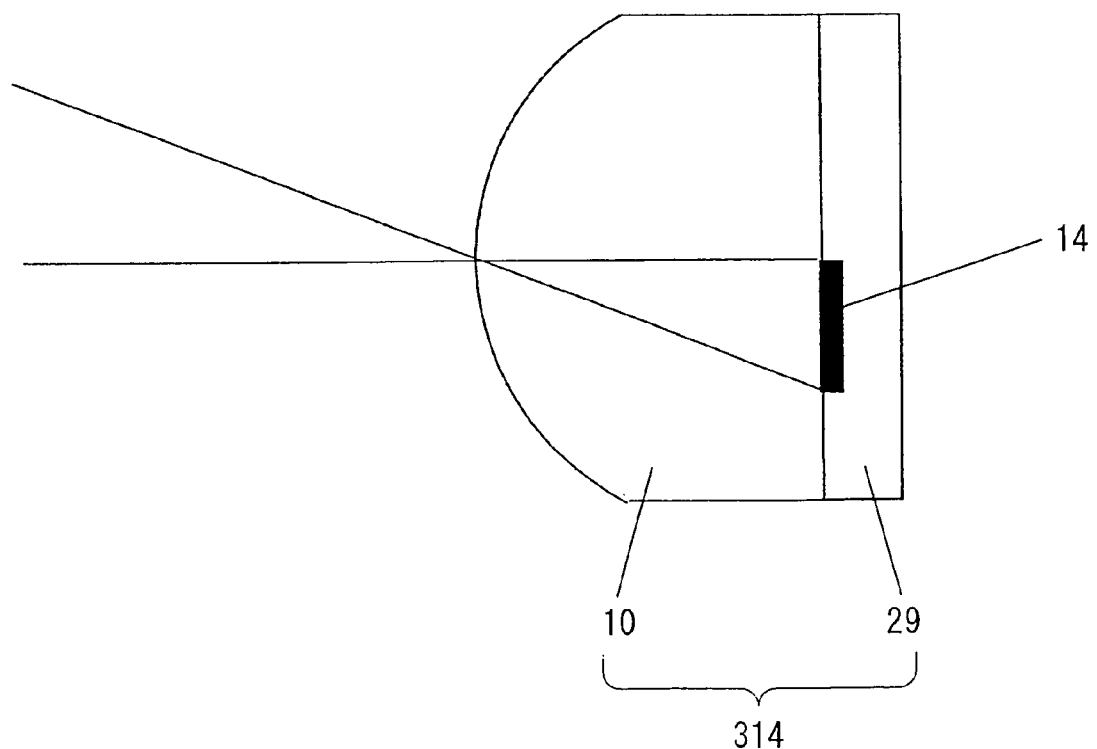

FIG. 8B is a sectional view of a focus detection pixel 314. At the focus detection pixel 314, the micro lens 10 is disposed to the front of the photoelectric conversion unit 14 and an image of the photoelectric conversion unit 14 is projected frontward via the microlens 10. The photoelectric conversion unit 14 is formed on the semiconductor circuit substrate 29, with the micro lens 10 fixed as an integrated part thereof through a semiconductor image sensor manufacturing process. The photoelectric conversion unit 14 is disposed on the other side of the optical axis of the micro lens 10, i.e., on the opposite side from the photoelectric conversion unit 13.

Figure 9:
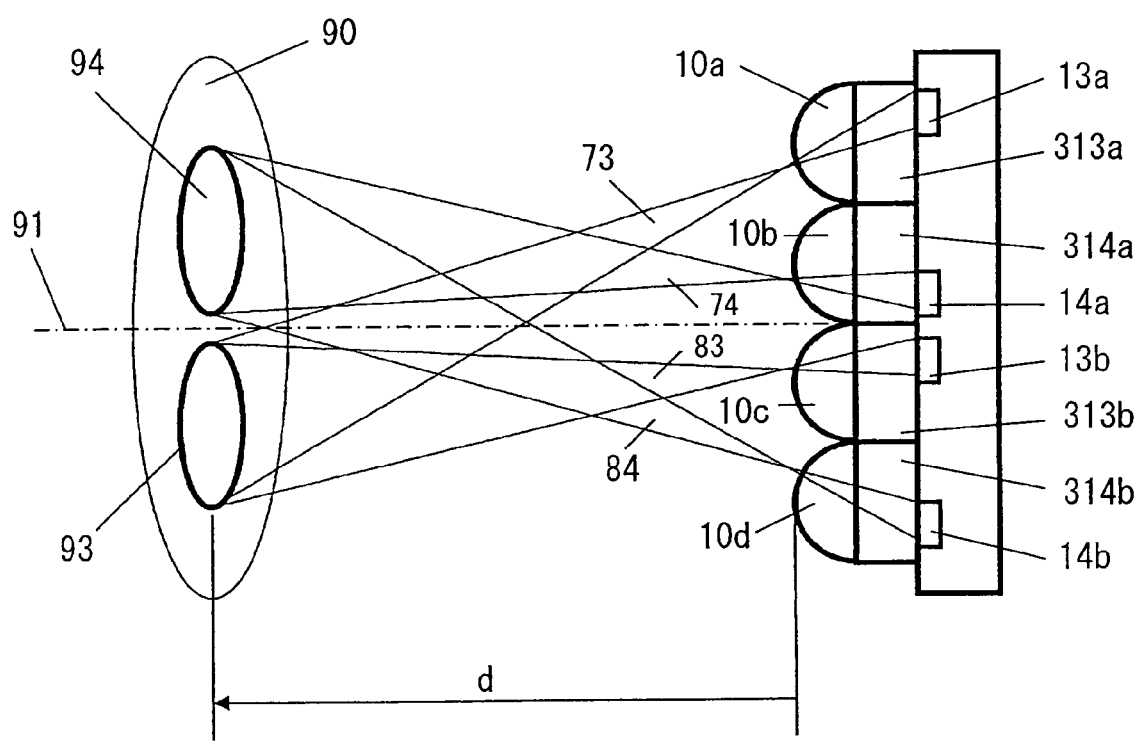
FIG. 9 shows the structure of a focus detection optical system that detects the focusing condition via micro lenses by adopting the split-pupil phase detection method.

FIG. 9 shows the structure of a focus detection optical system that detects the focusing condition via micro lenses by adopting the split pupil phase detection method. Reference numeral 90 in FIG. 9 indicates the exit pupil set over a distance d along the frontward direction from the micro-lenses disposed at the predetermined imaging plane of the interchangeable lens 202 (see FIG. 1). The distance d is determined in correspondence to the curvature of the micro-lenses, the refractive index of the micro-lenses, the distance between the micro-lenses and the photoelectric conversion units and the like, and is referred to as the pupil distance for focus detection in this description. Reference numeral 91 indicates the optical axis of the interchangeable lens, reference numerals 10a~10d each indicate a micro-lens, reference numerals 13a, 13b, 14a and 14b each indicate a photoelectric conversion unit, reference numerals 313a, 313b, 314a and 314b each indicate a focus detection pixel and reference numerals 73, 74, 83 and 84 indicate focus detection light fluxes.

Reference numeral 93 indicates a range defined by the photoelectric conversion units 13a and 13b projected via the micro-lenses 10a and 10c, and this range is hereafter referred to as a focus detection pupil in the description. While FIG. 9 shows this area as an elliptical area to simplify the illustration, the area actually assumes the shape of the photoelectric conversion units projected in an enlarged state. Reference numeral 94 indicates a range defined by the photoelectric conversion units 14a and 14b projected via the micro-lenses 10b and 10d, i.e., a focus detection pupil.

While FIG. 9 schematically shows the four successive focus detection pixels 313a, 313b, 314a and 314b, the photoelectric conversion units of other focus detection pixels, too, receive light fluxes arriving at their micro-lenses from the corresponding focus detection pupils. The focus detection pixels are arrayed in a direction matching the direction in which the pair of focus detection pupils are set side-by-side.

The micro lenses 10a~10d are disposed near the predetermined imaging plane of the interchangeable lens 202 (see FIG. 1). Via the micro lenses 10a~10d, the photoelectric conversion units 13a, 13b, 14a and 14b disposed behind them are projected onto the exit pupil 90 set apart from the micro lenses 10a~10d by the pupil distance for focus detection d. The shapes of the projected photoelectric conversion units define the focus detection pupils 93 and 94. Namely, the directions along which images are projected via the individual focus detection pixels are determined so that the projected shapes (the focus detection pupils 93 and 94) of the photoelectric conversion units at the various focus detection pixels are aligned on the exit pupil 90 located over the projection distance d.

The light flux 73 having passed through the focus detection pupil 93 and advanced to the micro lens 10a forms an image on the micro lens 10a. The photoelectric conversion unit 13a outputs a signal corresponding to the intensity of the light in the image thus formed. Likewise, the light flux 83 having passed through the focus detection pupil 93 and advanced to the micro lens 10c forms an image on the micro lens 10c, and the photoelectric conversion unit 13b outputs a signal corresponding to the intensity of the light in the image thus formed.

In addition, the light flux 74 having passed through the focus detection pupil 94 and advanced to the micro lens 10b forms an image on the micro lens 10b. The photoelectric conversion unit 14a outputs a signal corresponding to the intensity of the light in the image thus formed. Likewise, the light flux 84 having passed through the focus detection pupil 94 and advanced to the micro lens 10d forms an image on the micro lens 10d, and the photoelectric conversion unit 14b outputs a signal corresponding to the intensity of the light in the image thus formed.

By linearly disposing a large number of the two different types of focus detection pixels each structured as described above and integrating the outputs from the photoelectric conversion units at the individual pixels into output groups each corresponding to one of the two focus detection pupils 93 and 94, information related to the intensity distribution of the pair of images formed on the focus detection pixel row with the individual focus detection light fluxes passing through the focus detection pupil 93 and the focus detection pupil 94 is obtained. Image shift detection arithmetic processing (correlation arithmetic processing) to be detailed later is subsequently executed by using the information thus obtained so as to detect the image shift amount manifested by the pair of images through the split-pupil phase detection method. Then, by executing a conversion operation on the image shift amount in correspondence to the distance between the gravitational centers of the pair of focus detection pupils, the deviation (defocus amount) of the current image forming plane (the image forming plane corresponding to the focus detection position on the photographic image plane) relative to the predetermined imaging plane (corresponding to the position of the micro-lens array) is calculated.

Figure 10:
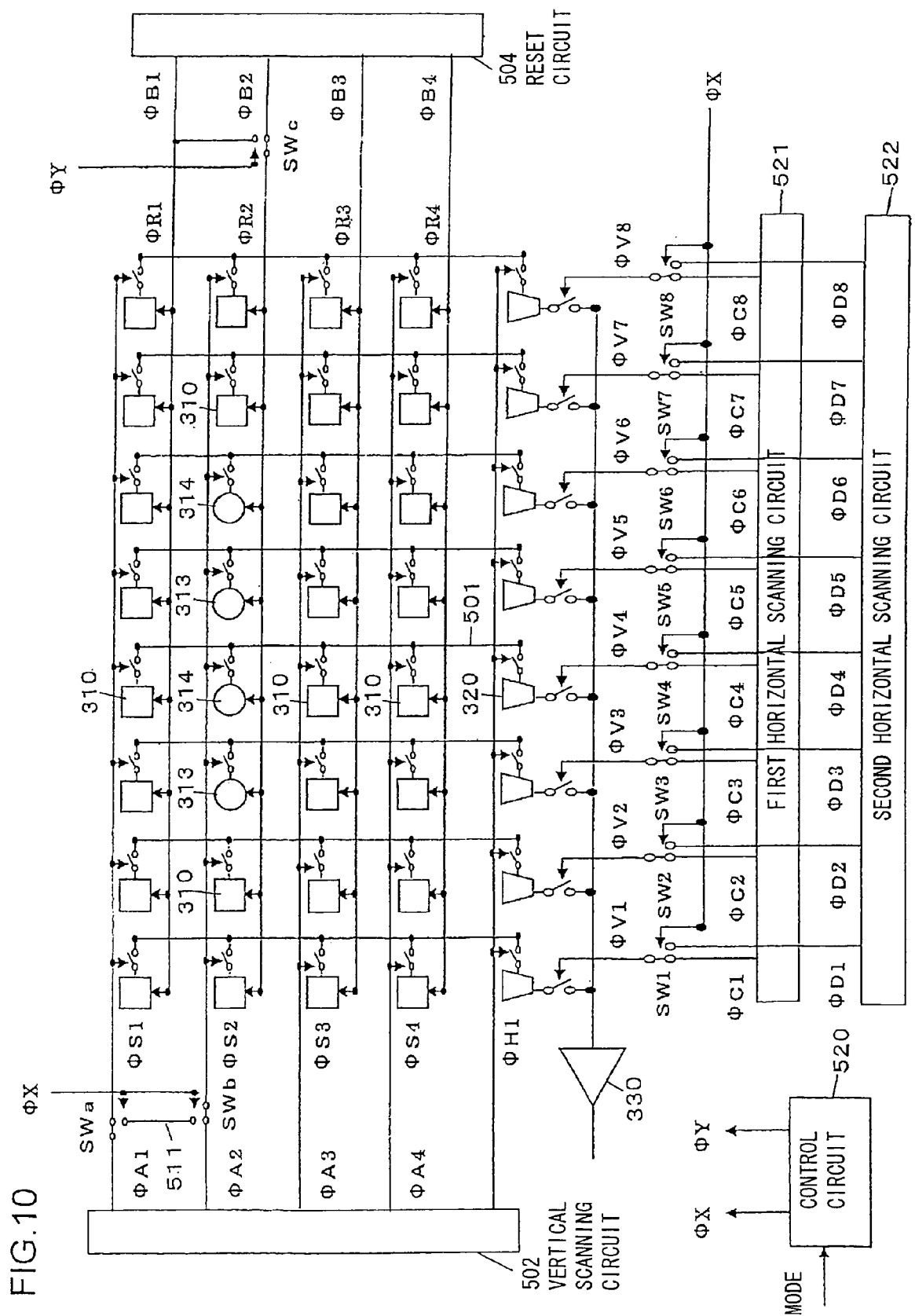
FIG. 10 is a conceptual diagram of the circuit structure at the image sensor 212 engaged in an all-pixel read (normal operation mode)

FIG. 10 is a conceptual diagram showing the circuit structure of the image sensor 212, in a simplified illustration of the image sensor 212 with an eight pixel (across) by four pixel (down) layout. The image sensor 212 is constituted with a CMOS image sensor. The focus detection pixels are disposed in the second row from the top in FIG. 10, which shows only the four central focus detection pixels 313 and 314 representing a plurality of focus detection pixels and two imaging pixels 310 on the left side and on the right side of the four focus detection pixels to represent a plurality of imaging pixels disposed on either side of the focus detection pixels. In the first row, the third row and the fourth row starting from the top, only imaging pixels 310 are disposed and these rows represent a plurality of rows where only imaging pixels are disposed, set above and below the row in which the focus detection pixels are present.

Line memories 320 are buffers where the pixel signals from the pixels in a given row on sample-hold are temporarily held. They sample-hold the pixel signals in the particular row, output to vertical signal lines 501, based upon a control signal ØH1 provided from a vertical scanning circuit 502. It is to be noted that the pixel signals held in the line memories 320 are reset in synchronization with the leading edge of a control signal among control signals ØS1~ØS4.

The outputs of the pixel signals from the imaging pixels 310 and the focus detection pixels 313 and 314 are controlled independently for the individual rows based upon the control signals (ØS1~ØS4) provided from the vertical scanning circuit 502. The pixel signals at the pixels in a row selected via the control signal (among the control signals ØS1~ØS4) are output to the vertical signal lines 501 and they are then sample-held in the line memories 320 based upon the control signal ØH1 provided from the vertical scanning circuit 502. The pixel signals held in the line memories 320 are transferred to an output circuit 330 in sequence in response to horizontal scanning control signals (ØV1~ØV8). The pixel signals are amplified at a preselected amplification factor at the output circuit 330 before they are output to the outside. Once their pixel signals become sample-held, the imaging pixels 310 and the focus detection pixels 313 and 314 are reset in response to control signals (ØR1~ØR4) and start storing electrical charges for subsequent pixel signal.

The image sensor 212 is engaged in operation in either of the following two operation modes. In one of the operation modes, a normal pixel signal output operation is executed in order to record image information by capturing an image (all-pixel read mode). The other mode is a sub-sampling read mode in which pixel signals are read through a sub-sampling read executed along the vertical direction, and also through a sub-sampling read executed along the horizontal direction and the signals read out are then output to be used for image information display at the liquid crystal display element 216 functioning as the EVF. In the all-pixel read mode, the image information for a full frame is read out at once. In the sub-sampling read mode, on the other hand, image information for a frame is read out through time-sharing as two sets of sub-sampled image information corresponding to a first field and a second field.

Figure 11:
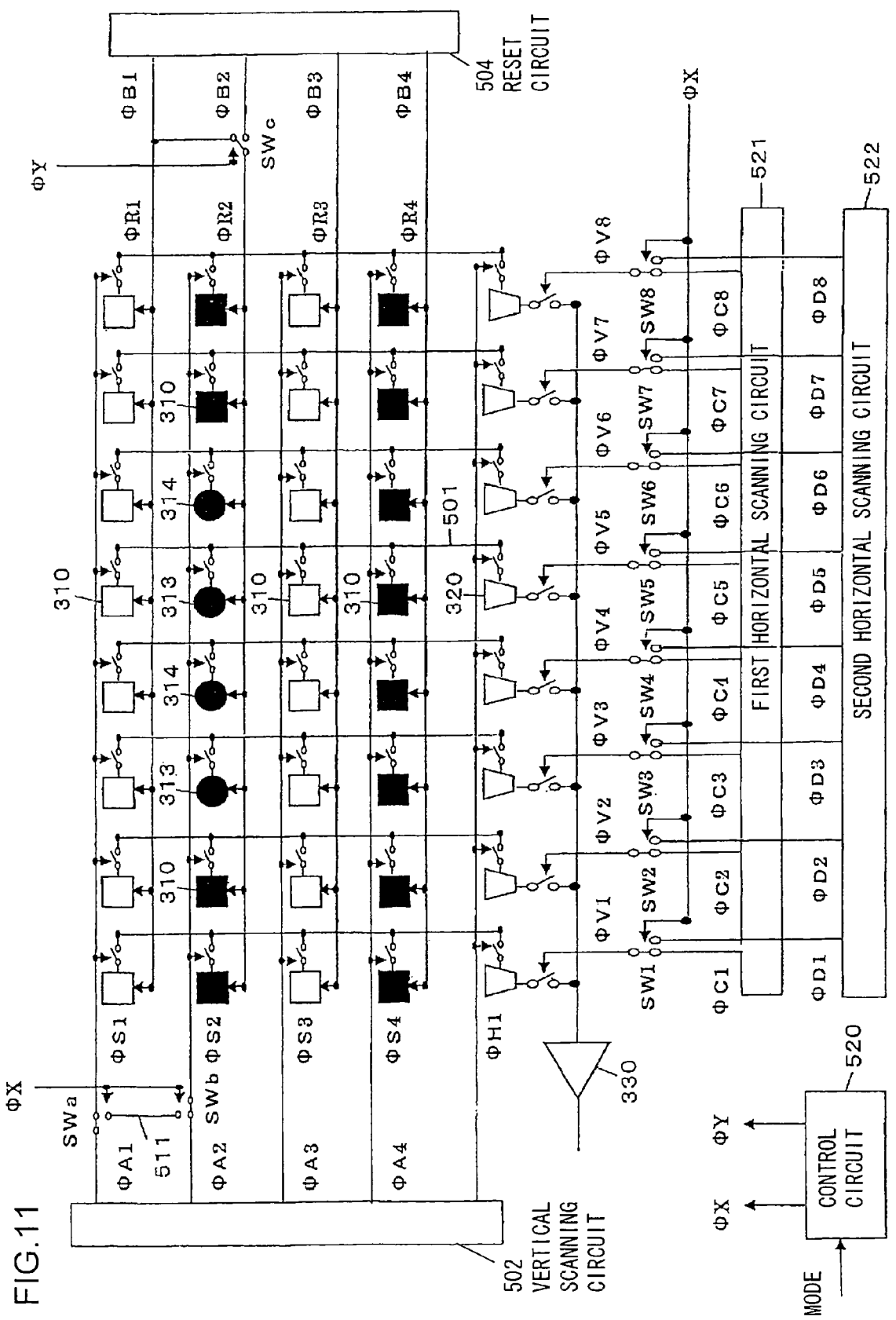
FIG. 11 is a conceptual diagram of the circuit structure at the image sensor 212 engaged in an odd-numbered field read.
Figure 12:
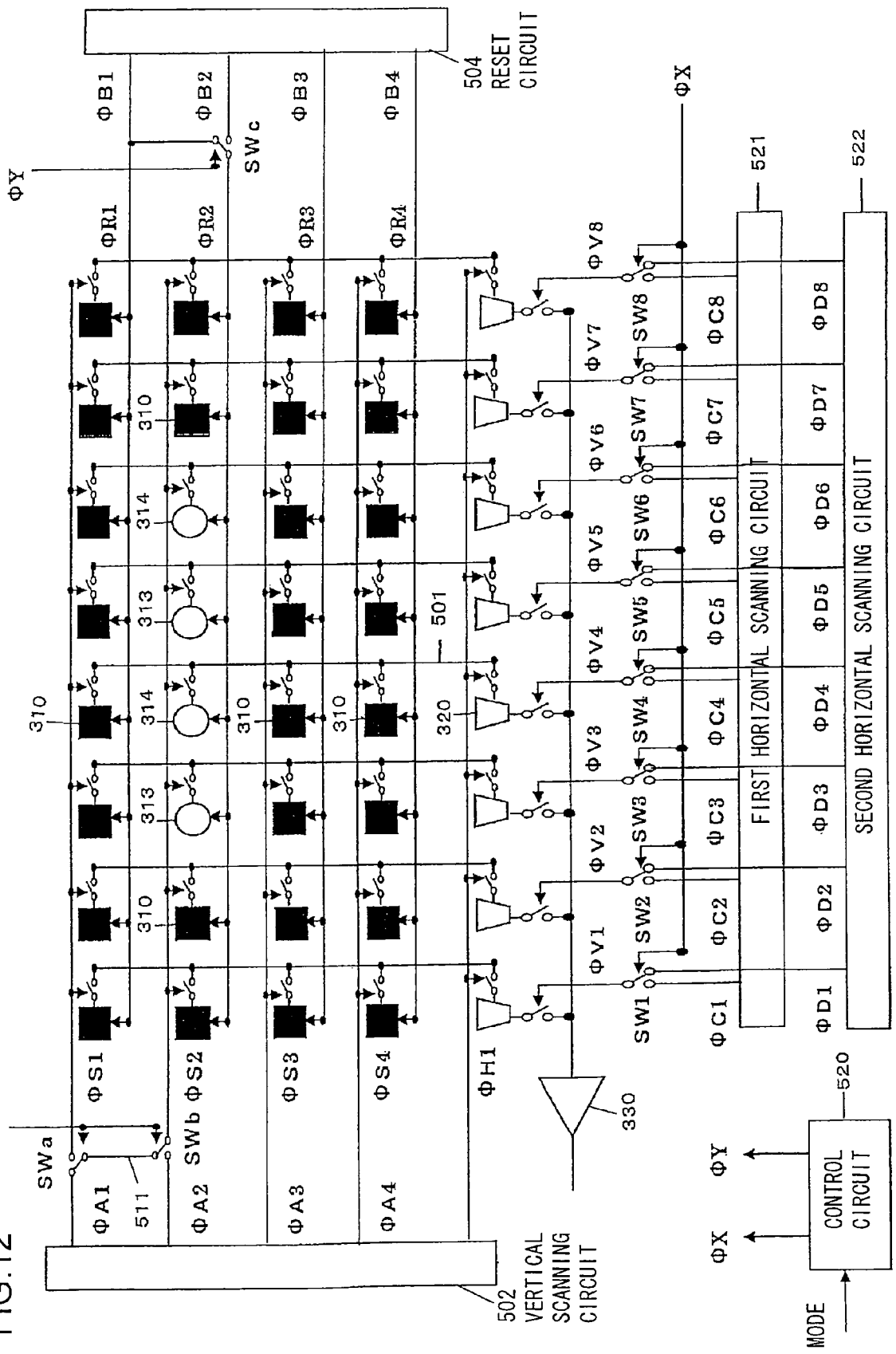
FIG. 12 is a conceptual diagram of the circuit structure at the image sensor 212 engaged in an even-numbered field read.

All the pixels are unfilled in FIG. 10, indicating that their pixel signals are read out all at once as the image information for a single frame in the all-pixel read mode. The unfilled pixels in the first row and the third row in FIG. 11 are the pixels from which the pixel signals are read out as first field image information in the sub-sampling read mode. The four unfilled focus detection pixels 313 and 314 in the second row in FIG. 12 are read out successively in the second field in the sub-sampling read mode.

The operation mode is switched in response to a control signal (Mode) provided from an external source outside the image sensor, and a control circuit 520 generates internal control signals ØX and ØY to be used to control the two operation modes in response to the instruction provided via the control signal (Mode). Scanning signals ØA1~ØA4 are generated from the vertical scanning circuit 502. The signal lines for the scanning signals ØA3 and ØA4 are respectively connected to the signal lines for the control signals ØS3 and ØS4.

A switch SWa is installed between the signal line for the scanning signal ØA1 and the signal line for the control signal ØS1, whereas a switch SWb is installed between the signal line for the scanning signal ØA2 and the signal line for the control signal ØS2. These two switches SWa and SWb are switched by the control signal ØX generated at the control circuit 520. When the control signal ØX is at low, the signal line for the scanning signal ØA1 and the signal line for the control signal ØS1 are connected and also the signal line for the scanning signal ØA2 and the signal line for the control signal ØS2 are connected. When the control signal ØX is at high, on the other hand, the signal line for the scanning signal ØA1 is connected with a signal line 511, the signal line 511 is connected with the signal line for the control signal ØS2 and thus the signal line for the scanning signal ØA1 and the signal line for the control signal ØS2 are connected.

At a reset circuit 504, scanning signals ØB1~ØB4 are generated. The signal lines for the scanning signals ØB1, ØB3 and ØB4 are respectively connected with the signal lines for the control signals ØR1, ØR3 and ØR4. A switch SWc is installed between the signal line for the scanning signal ØB2 and the signal line for the control signal ØR2, and the SWc is switched by the control signal ØY generated at the control circuit 520. When the control signal ØY is at low, the signal line for the scanning signal ØB2 and the signal line for the control signal ØR2 are connected. When the control signal ØY is at high, on the other hand, the signal line for the control signal ØR2 is connected to the signal line for the scanning signal ØB1.

A first horizontal scanning circuit 521 and a second horizontal scanning circuit 522 are installed to execute horizontal scanning. The signal lines for scanning signals ØC1~ØC8 provided from the first horizontal scanning circuit 521 and the signal lines for scanning signals ØD1~ØD8 provided from the second horizontal scanning circuit 522 are selectively connected to the signal lines for the control signals ØV1~ØV8 via switches SW1~SW8. The switches SW1~SW8 are switched by the control signal ØX generated at the control circuit 520. When the control signal ØX is at low, the signal lines for the scanning signals ØC1~ØC8 are connected to the signal lines for the control signals ØV1~ØV8, whereas when the control signal ØX is at high, the signal lines for the scanning signals ØD1~ØD8 are connected to the signal lines for the control signals ØV1~ØØV8.

When the image sensor 212 is set in the all-pixel read mode, the rows are scanned continuously along the vertical direction while continuous column scanning along the horizontal direction is in progress. When the image sensor 212 is set in the sub-sampling read mode, rows are scanned along the vertical direction by skipping the row where the focus detection pixels 313 and 314 are present and sub-sampling summing is executed along the horizontal direction for the column scanning in correspondence to the first field. In addition, rows are scanned along the vertical direction through sub-sampled row scanning without skipping the row where the focus detection pixels 313 and 314 are present in correspondence to the second field. For the column scanning executed along the horizontal direction, continuous read is executed for the columns containing the focus detection pixels 313 and 314 whereas horizontal sub-sampling summing is executed for the columns that do not include focus detection pixels 313 and 314.

In the sub-sampling read mode described above, the vertical scanning circuit 502, the reset circuit 504, the first horizontal scanning circuit 521 and the second horizontal scanning circuit 522 execute identical operations for the first field and second field. Namely, either in the first field or the second field, the vertical scanning circuit 502 generates the scanning signals ØA1~ØA4 with identical patterns, the reset circuit 504 generates the scanning signals ØB1~ØB4 with identical patterns, the first horizontal scanning circuit 521 generates the scanning signals ØC1~ØC8 with identical patterns and the second horizontal scanning circuit 522 generates the scanning signals ØD1~ØD8 with identical patterns.

Scanning patterns determined in relation to the pixel control signals (ØS1~ØS4, ØR1~ØR4 and ØV1~ØV8) for the first field and the second field are switched simply by switching the switches SWa, SWb, SWc and SW1~SW8 via the control signals ØX and ØY generated at the control circuit 520. It is to be noted that the control circuit 520 outputs an ID signal, used to identify the pixel signals output in the sub-sampling read mode as either the first field signals or the second field signals, to the outside.

Figure 13:
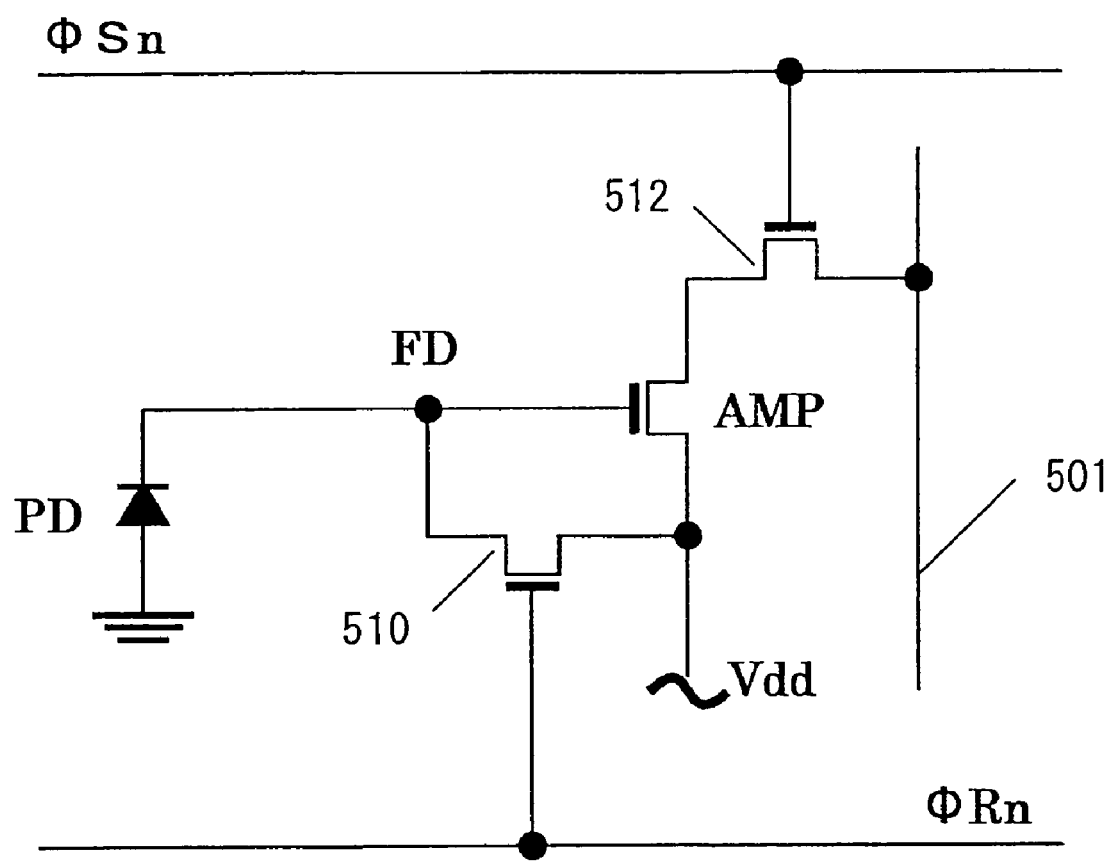
FIG. 13 is a detailed circuit diagram pertaining to the imaging pixels and the focus detection pixels in the image sensor.

FIG. 13 is a detailed circuit diagram pertaining to the image in pixels 310 and the focus detection pixels 313 and 314 at the image sensor 212 shown in FIGS. 10 through 12. The photoelectric conversion units in these pixels are each constituted with a PD (photodiode). The electrical charge accumulated in the PD is stored at an FD (floating diffusion). The FD is connected to the gate of an amplifier MOS transistor (AMP), which generates a signal corresponding to the level of electrical charge stored at the FD.

The FD is connected to a source Vdd via a reset MOS transistor 510 and as the reset MOS transistor 510 enters an ON state in response to a control signal ØRn (one among ØR1~ØR4), the electrical charge accumulated in the FD and the PD is cleared and the FD enters a reset state. The output from the AMP is connected to the corresponding vertical signal line 501 via a row selector MOS transistor 512 and as the row selector MOS transistor 512 enters an ON state in response to a control signal ØSn (one among ØS1~ØS4), the output of the AMP is provided to the vertical signal line 501.

Figure 14:
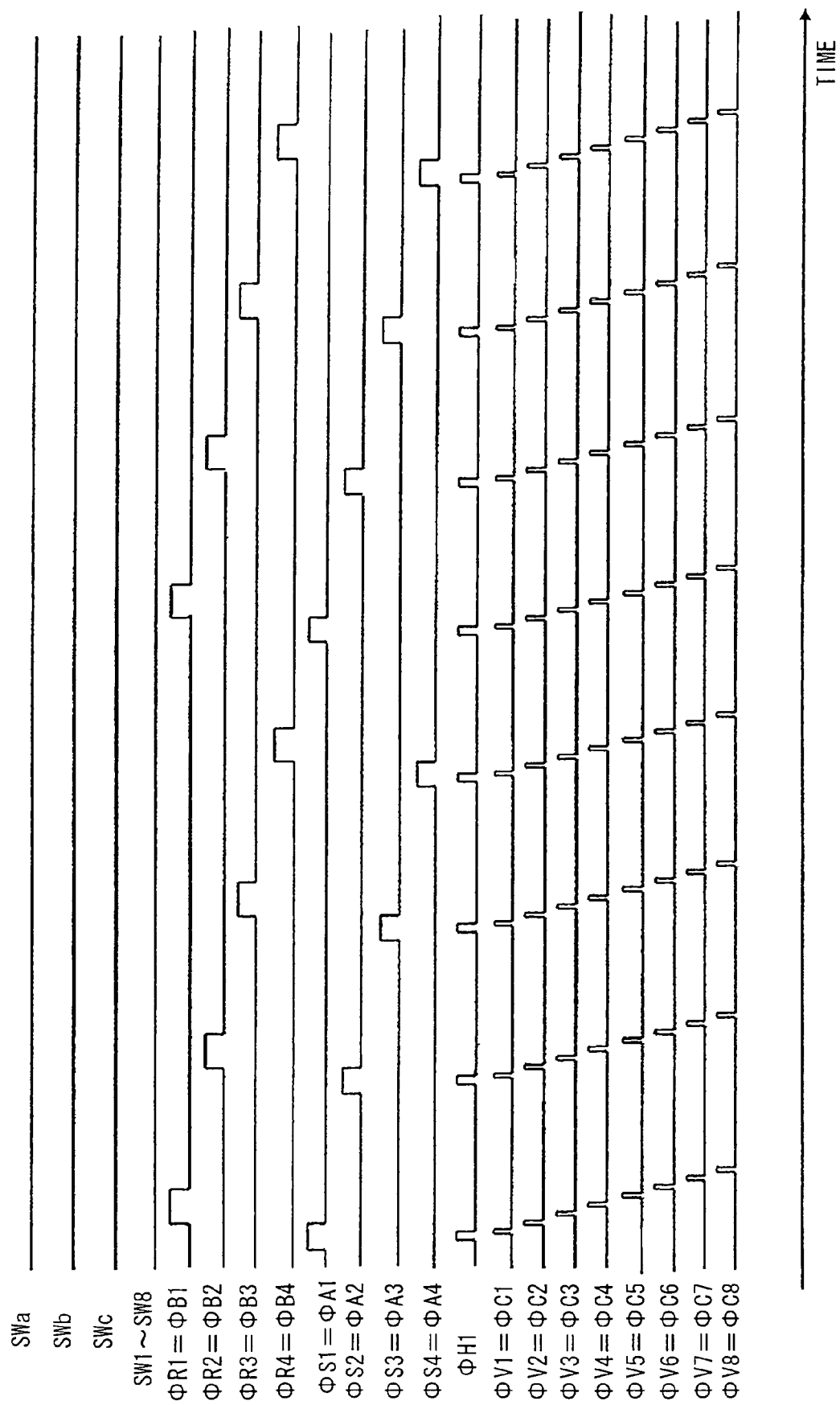
FIG. 14 is an operation timing chart of the operation executed at the image sensor 212 in the normal operation mode.
Figure 15:
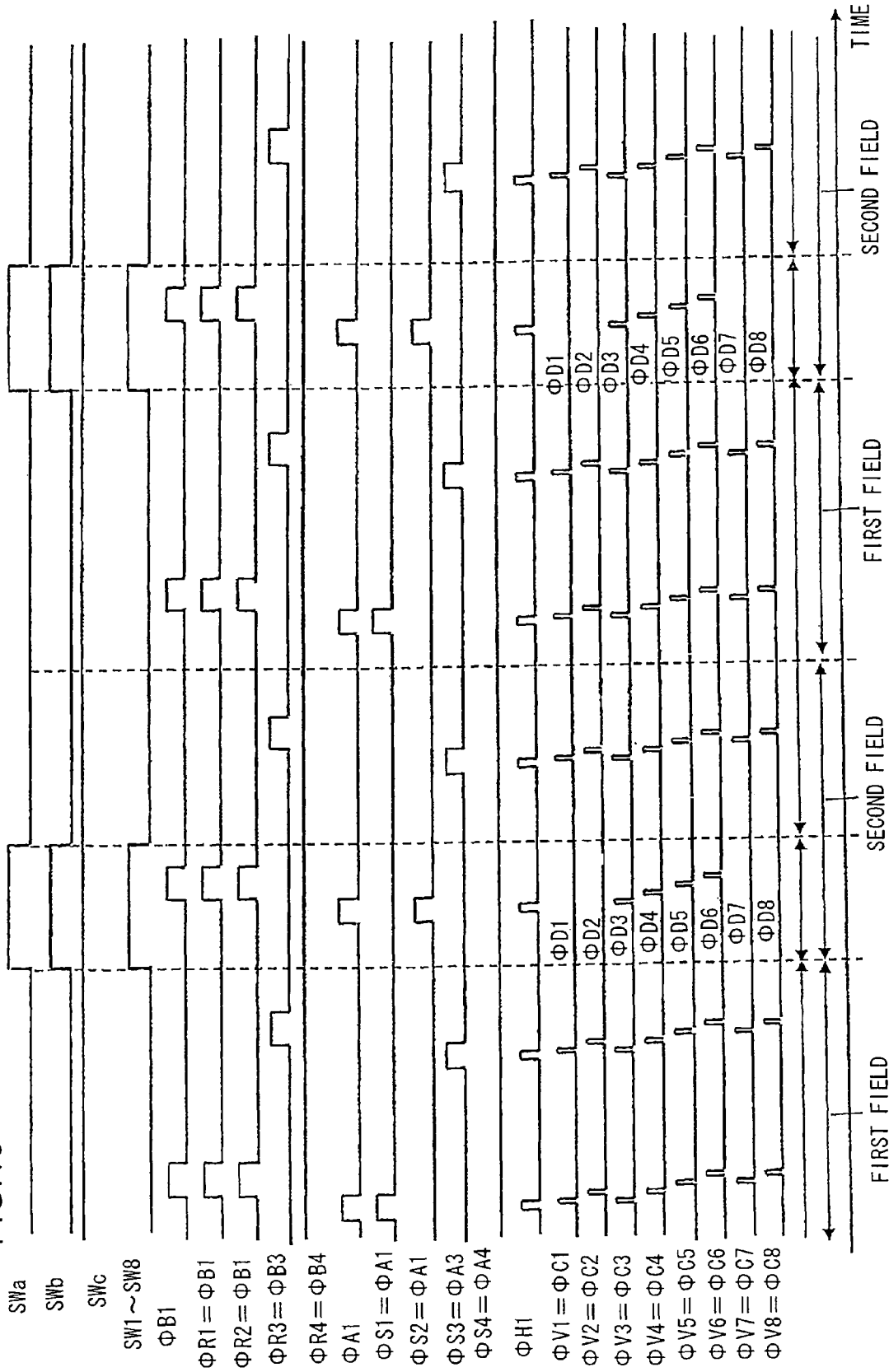
FIG. 15 is an operation timing chart of the operation executed at the image sensor 212 in the sub-sampling read mode.
Figure 16:
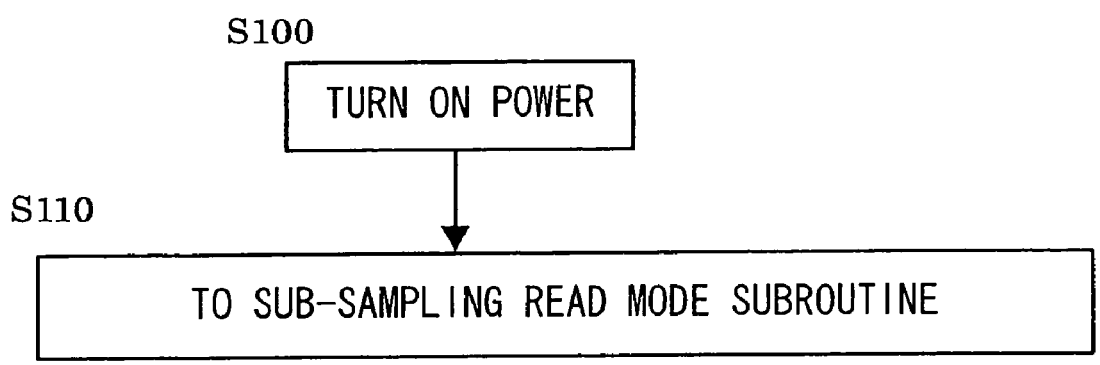
FIG. 16 presents a flowchart of the operation executed in the digital still camera.

Next, in reference to the timing charts provided in FIGS. 14 and 15, the read operation executed in the all-pixel read mode and the read operations for the first field and the second field executed in the sub-sampling read mode are described.

FIG. 14 is a timing chart of the operation executed in the all-pixel read mode shown in FIG. 10. In the all-pixel read mode, the control circuit 520 sets the control signals ØX and ØY to low in response to the instruction in the Mode signal input thereto from the outside. As shown in FIG. 10, as the control signal ØX is set to low, the signal line for the scanning signal ØA1 and the signal line for the control signal ØS1 become connected via the switch SWa and the signal line for the scanning signal ØA2 and the signal line for the control signal ØS2 become connected via the switch SWb. In addition, via the switches SW1~SW8, the signal lines for the scanning signals ØC1~ØC8 become connected to the signal lines for the control signals ØV1~ØV8. As the control signal ØY is set to low, the signal line for the scanning signal ØB2 becomes connected to the signal line for the control signal ØR2.

As shown in FIG. 14, the imaging pixels 310 in the first row are selected by the control signal ØS1 (=ØA1) provided from the vertical scanning circuit 502 and the pixel signals at the selected imaging pixels 310 are output to the vertical signal lines 501. The pixel signals from the first row, output to the vertical signal lines 501, are temporarily held in the line memories 320 based upon the instruction in the control signal ØH1 generated in synchronization with the control signal ØS1. The pixel signals from the imaging pixels 310 in the first row held in the line memories 320 are transferred to the output circuit 330 in response to the scanning signals ØC1~ØC8 (match the control signals ØV1~ØV8) provided from the first horizontal scanning circuit 521. The pixel signals are then amplified at a preselected amplification factor at the output circuit 330 before they are output to the outside.

Once the transfer of the pixel signals from the first-row imaging pixels 310 to the line memories 320 ends, the imaging pixels 310 in the first row are reset in response to the control signal ØR1 provided from the reset circuit 504 and subsequent electrical charge at the imaging pixels 310 in the first row starts with the timing of the trailing edge of the control signal ØR1. Once the output circuit 330 finishes outputting the pixel signals originating at the first-row imaging pixels 310, the imaging pixels 310 and the focus detection pixels 313 and 314 in the second row are selected by the control signal ØS2 (=ØA2) provided from the vertical scanning circuit 502 and the pixel signals from the selected imaging pixels 310 and focus detection pixels 313 and 314 are output to the vertical signal lines 501. Subsequently, the pixel signals at the imaging pixels 310 and the focus detection pixels 313 and 314 in the second row are held, the individual pixels are reset, the pixel signals are output and the next electrical charge starts in a similar manner.

Next, the pixel signals from the imaging pixels 310 in the third and fourth rows are held, the imaging pixels 310 are reset, the pixel signals from the imaging pixels 310 are output and the subsequent electrical charge starts in sequence. Once the output of the pixel signals from all the pixels is completed through this process, the first row is selected again and the operation described above is repeatedly executed in cycles. It is to be noted that by adjusting the pulse width of the control signals ØR1~ØR4, the length of time over which electrical charges are accumulated at the imaging pixels and the focus detection pixels (the length of exposure time) can be adjusted. While FIG. 14 presents a flowchart of the operation through which the electrical charge storage and the pixel signal output for the first through fourth rows are repeatedly executed in cycles, this operation may be executed as a one-off single-cycle operation. Such a one-off normal operation mode (all-pixel read mode) is assumed during a photographic operation.

FIG. 15 presents a timing chart of the operation executed in the sub-sampling read mode shown in FIGS. 11 and 12. As shown in FIG. 15, the first field read and the second field read are alternately executed repeatedly in the sub-sampling read mode. The pixels in the first row and the third row read for the first field read are all imaging pixels 310 and the pixel signals at these imaging pixels are read out through sub-sampling summing read. In the second field read, the pixel signals from the second row, which includes the focus detection pixels 313 and 314, instead of the first row, are read out and also the pixel signals are read out from the third row where only imaging pixels 310 are disposed as in the first field read. In the second field read, the pixel signals at the focus detection pixels 313 and 314 in the second row that includes the imaging pixels 310 are simply read out in succession without adding them together, whereas the pixel signals at the imaging pixels 310 in the third row are read out through sub-sampling summing read as in the first field read.

For the first field read, the control circuit 520 sets the control signal ØX to low and the control signal ØY to high. As shown in FIG. 11, as the control signal ØX shifts to low, the signal line for the scanning signal ØA1 and the signal line for the control signal ØS1 become connected with each other via the switch SWa and the signal line for the scanning signal ØA2 and the signal line for the control signal ØS2 become connected with each other via the switch SWb. Namely, the state expressed as; ØA1=ØS1 and ØA2=ØS2, is achieved. In addition, via the switches SW1~SW8, the signal lines for the scanning signals ØC1~ØC8 become connected to the signal lines for the control signals ØV1~ØV8 and thus, the state expressed as; ØC1=ØV1, ØC2=ØV2, ØC3=ØV3, ØC4=ØV4, ØC5=ØV5, ØC6=ØV6, ØC7=ØV7 and ØC8=ØV8, is achieved. As the control signal ØY is set to high, the signal line for the scanning signal ØB1 and the signal line for the control signal ØR2 become connected with each other and the state expressed as; ØB1=ØR2, is achieved.

The imaging pixels 310 in the first row are selected by the control signal ØS1 (=ØA1) provided from the vertical scanning circuit 502 and the pixel signals at the selected imaging pixels 310 are output to the vertical signal lines 501. The pixel signals from the first row, output to the vertical signal lines 501, are temporarily held in the line memories 320 based upon the instruction in the control signal ØH1 generated in synchronization with the control signal ØS1. The pixel signals from the imaging pixels 310 in the first row held in the line memories 320 are transferred to the output circuit 330 in response to the control signals ØV1~ØV8 (match the scanning signals ØC1~ØC8) provided from the first horizontal scanning circuit 521. The pixel signals are then amplified at the preselected amplification factor at the output circuit 330 before they are output to the outside.

In the scanning pattern determined by the control signals ØV1~ØV8, pulses are first generated for the control signals ØV1 and ØV3, so as to add up the pixel signals at the imaging pixel 310 in the first column and the pixel signal at the imaging pixel 310 in the third column and output the sum, as shown in FIG. 15. Next, pulses are generated for the control signals ØV2 and ØV4, so as to add up the pixel signals at the imaging pixel 310 in the second column and the pixel signal at the imaging pixel 310 in the fourth column and output the sum. Then, pulses are generated for the control signals ØV5 and ØV7, so as to add up the pixel signals at the imaging pixel 310 in the fifth column and the pixel signal at the imaging pixel 310 in the seventh column and output the sum. Finally, pulses are generated for the control signals ØV6 and ØV8, so as to add up the pixel signals at the imaging pixel 310 in the sixth column and the pixel signal at the imaging pixel 310 in the eighth column and output the sum. The number of pixel signal outputs from the first row is four, significantly fewer than the eight pixels that would be output through a successive read.

Once the transfer of the pixel signals from the first-row imaging pixels 310 to the line memories 320 ends, the imaging pixels 310 in the first row and the imaging signals 310 and the focus detection pixels 313 and 314 in the second row are reset in response to the control signals ØR1 and ØR2 (=ØB1) provided from the reset circuit 504, and subsequent electrical charge at the imaging pixels 310 in the first row and the imaging pixels 310 and the focus detection pixels 313 and 314 in the second row starts with the timing of the trailing edge of the control signals ØR1 and ØR2.

Once the output circuit 330 finishes outputting the pixel signals originating at the first-row imaging pixels 310, the imaging pixels 310 in the third row are selected by the control signal ØS3 (=ØA3) provided from the vertical scanning circuit 502 and the pixel signals from the selected imaging pixels 310 are output to the vertical signal lines 501. The pixel signals from the third row, output to the vertical signal lines 501, are temporarily held in the line memories 320 in response to the control signal ØH1 generated in synchronization with the control signal ØS3. The pixel signals from the imaging pixels 310 in the third row held in the line memories 320 undergo sub-sampling summing similar to that executed for the first row in response to the control signals ØV1~ØV8 (match the scanning signals ØC1~ØC8) generated at the first horizontal scanning circuit 521, the sums are transferred to the output circuit 330 and the sums amplified at the predetermined amplification factor at the output circuit 330 are ultimately output to the outside.

Once the transfer of the pixel signals from the third-row imaging pixels 310 to the line memories 320 ends, the imaging pixels 310 in the third row are reset in response to the control signal ØR3 provided from the reset circuit 504 and subsequent electrical charge at the imaging pixels 310 in the third row starts with the timing of the trailing edge of the control signal ØR3. The first field pixel signal read operation is thus completed.

The operation then shifts into the second field pixel signal read. As the output of the pixel signals at the imaging pixels 310 in the third row in the first field via the output circuit 330 ends, the control circuit 520 sets the control signal ØX to high and the control signal ØY to high. As shown in FIG. 12, when the control signal ØX is at high, the signal line for the scanning signal ØA1 and the signal line 511 are connected via the switch SWa and also the signal line 511 is connected to the signal line for the control signal ØS2 via the switch SWb. Namely, the state expressed as; ØA1=ØS2, is achieved. In addition, via the switches SW1~SW8, the signal lines for the scanning signals ØD1~ØD8 are connected to the signal lines for the control signals ØV1~ØV8 and thus, the state expressed as; ØD1=ØV1, ØD2=ØV2, ØD3=ØV3, ØD4=ØV4, ØD5=ØV5, ØD6=ØV6, ØD7=ØV7 and ØD8=ØV8, is achieved. When the control signal ØY is set to high, the signal line for the scanning signal ØB1 and the signal line for the control signal ØR2 are connected and the state expressed as; ØB1=ØR2, is achieved.

For the second field read, the imaging pixels 310 and the focus detection pixels 313 and 314 in the second row, instead of the imaging pixels in the first row, are selected by the control signal ØS2 (=ØA1) provided from the vertical scanning circuit 502. The pixel signals from the selected imaging pixels 310 and focus detection pixels 313 and 314 are output to the vertical signal lines 501. The pixel signals from the imaging pixels 310 and the focus detection pixels 313 and 314 in the second row, output to the vertical signal lines 501, are then temporarily held in the line memories 320 in response to the control signal ØH1 generated in synchronization with the control signal ØS2.

The pixel signals originating at the second row and held in the line memories 320 are transferred to the output circuit 330 in response to the control signals ØV1~ØV8 (ØD1~ØD8) provided from the second horizontal scanning circuit 522. The pixel signals are then amplified at a preselected amplification factor at the output circuit 330 before they are output to the outside. While control signal pulses are generated in succession one at a time in the scanning pattern determined with the control signals ØV1~ØV8, as in the scanning pattern in the all-pixel read mode, only the control signals ØV3~ØV6 are generated. As a result, the pixel signals from the four focus detection pixels 313 and 314 are output in succession without being added together. Since the number of outputs from the second row in the second field and the number of outputs from the first row in the first field are both four and thus equal to each other, the pixel signals can be read out through identical sequences without inducing any disruption in the output operation timing.

Once the transfer of the pixel signals from the second row to the line memories 320 ends, the imaging pixels 310 in the first row and the imaging signals 310 and the focus detection pixels 313 and 314 in the second row are reset in response to the control signals ØR1 and ØR2 (=ØB1) provided from the reset circuit 504, and subsequent electrical charge at the imaging pixels 310 in the first row and the imaging pixels 310 and the focus detection pixels 313 and 314 in the second row starts with the timing of the trailing edge of the control signals ØR1 and ØR2.

As the output of the second-row pixel signals via the output circuit 330 ends, the control signal 520 sets the control signal ØX to low and the control signal ØY to high. As shown in FIG. 12, as the control signal ØX shifts to low, the signal line for the scanning signal ØA1 and the signal line for the control signal ØS1 become connected with each other via the switch SWa and the signal line for the scanning signal ØA2 and the signal line for the control signal ØS2 become connected with each other via the switch SWb. Namely, the state expressed as; ØA1=ØS1 and ØA2=ØS2, is achieved. In addition, via the switches SW1~SW8, the signal lines for the scanning signals ØC1~ØC8 become connected to the signal lines for the control signals ØV1~ØV8 and thus, the state expressed as; ØC1=ØV1, ØC2=ØV2, ØC3=ØV3, ØC4=ØV4, ØC5=ØV5, ØC6=ØV6, ØC7=ØV7 and ØC8=ØV8, is achieved. As the control signal ØY is set to high, the signal line for the scanning signal ØB1 and the signal line for the control signal ØR2 become connected with each other and the state expressed as; ØB1=ØR2, is achieved.

With the control signals ØX and ØY respectively sustained at low level and high level, the control circuit 520 initiates the output of the pixel signals from the third row. The imaging pixels 310 in the third row are selected by the control signal ØS3 (=ØA3) provided from the vertical scanning circuit 502 and the pixel signals at the selected imaging pixels 310 are output to the vertical signal lines 501. The pixel signals in the third row, output to the vertical signal lines 501, are temporarily held in the line memories 320 based upon the instruction in the control signal ØH1 generated in synchronization with the control signal ØS3. The pixel signals from the third-row imaging pixels 310 held in the line memories 320 then undergo sub-sampling summing, as in the first row and the third row during the first field read, and the sums are transferred to the output circuit 330 in response to the control signals ØV1~ØV8 (match the scanning signals ØC1~C8) provided from the first horizontal scanning circuit 521. The pixel signal sums are then amplified at a preselected amplification factor at the output circuit 330 before they are output to the outside.

Once the transfer of the pixel signals from the third-row imaging pixels 310 to the line memories 320 ends, the imaging pixels 310 in the third row are reset in response to the control signal ØR3 (=ØB3) provided from the reset circuit 504 and subsequent electrical charge at the imaging pixels 310 in the third row starts with the timing of the trailing edge of the control signal ØR3. The second field pixel signal read operation is thus completed, and then the first field pixel signal read operation resumes during which the operation described earlier is cyclically executed.

FIGS. 16 through 19 each present a flowchart of the operation executed in the digital still camera shown in FIG. 1. The body drive control device 214 starts the power on operation in step S100 in FIG. 16 as the power to the camera is turned on and then, in step S110, the operation jumps to the sub-sampling read mode subroutine shown in FIG. 17.

Figure 17:
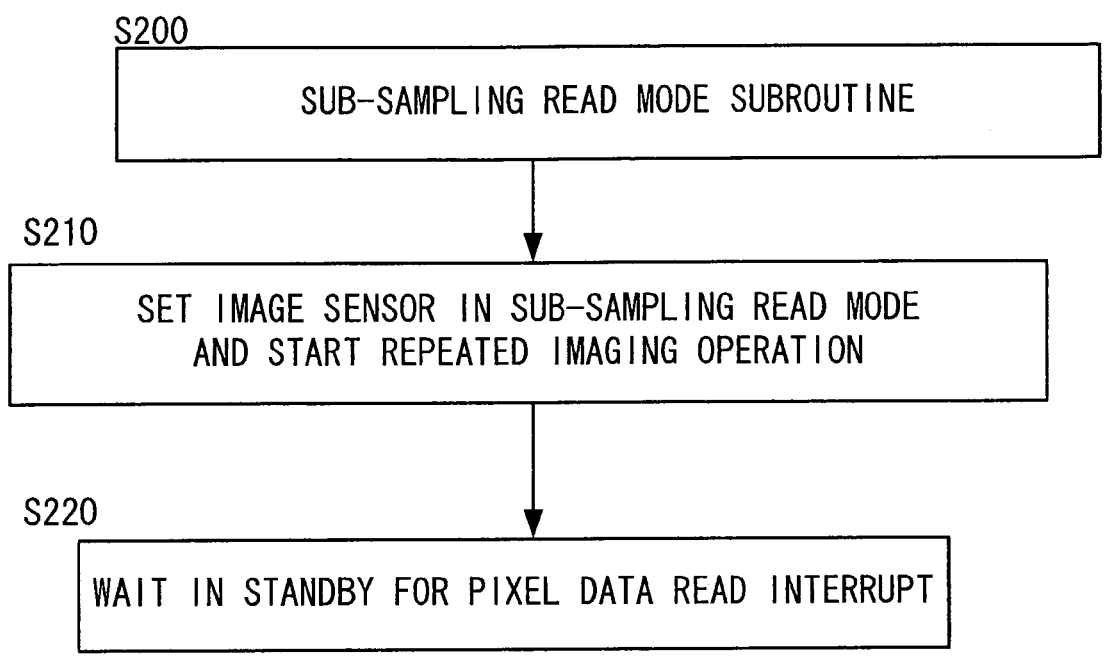
FIG. 17 presents a flowchart of the sub-sampling read subroutine.

FIG. 17 presents a flowchart of the sub-sampling read mode subroutine operation executed in the image sensor 212. The body drive control device 214 starts a read operation at the image sensor 212 in step S200. In step S210, the image sensor 212 is set in the sub-sampling read mode to start repeated imaging operation in the sub-sampling read mode. In the following step S220, the operation waits in standby for the pixel data read interrupt in FIG. 18.

Figure 18:
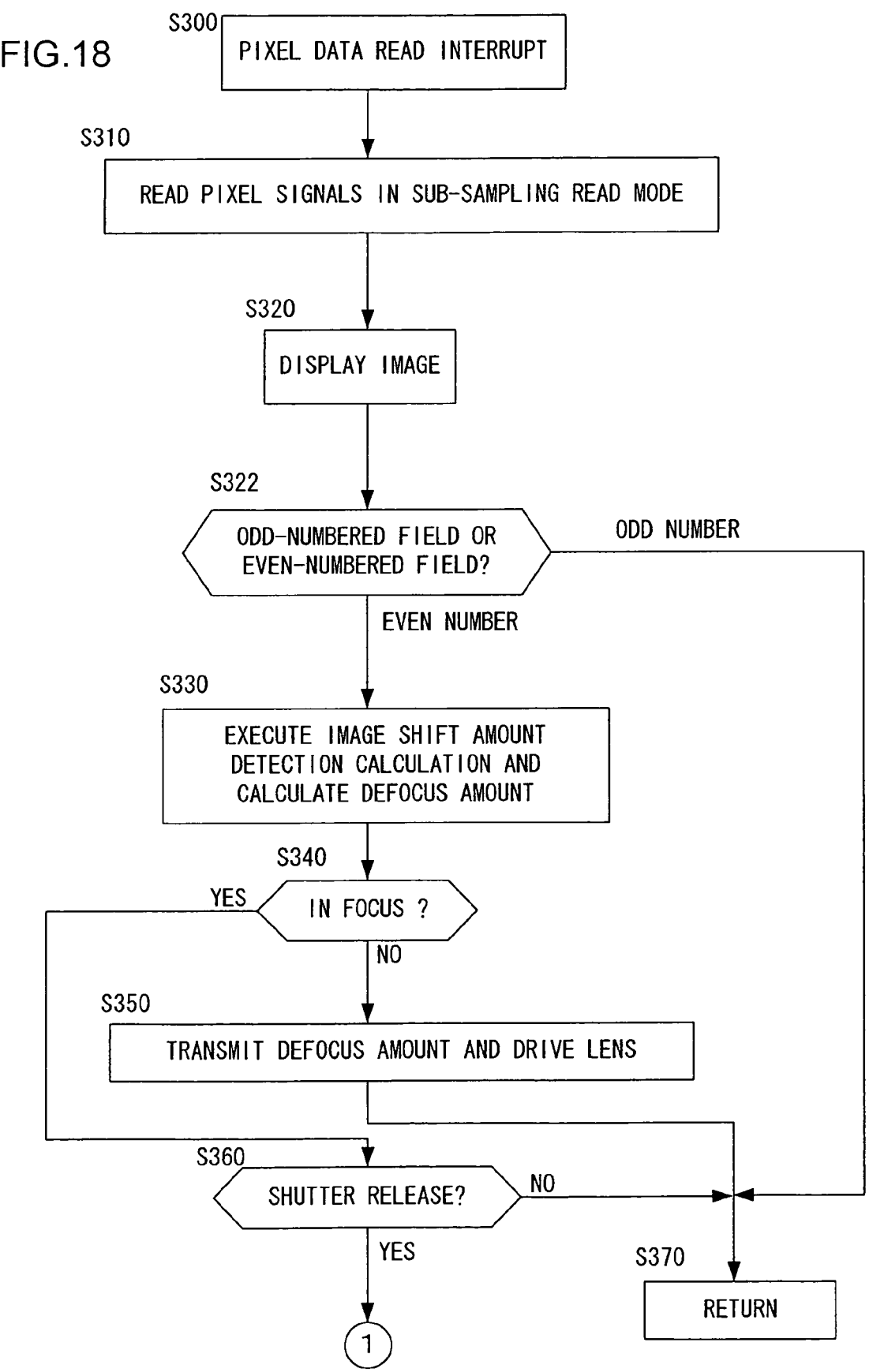
FIG. 18 presents a flowchart of the pixel data read interrupt routine.

FIG. 18 presents a flowchart of the pixel data read interrupt processing. As a pixel data read interrupt occurs in step S220 in FIG. 17, the body drive control device 214 starts the pixel data read interrupt processing. The image sensor 212 generates a pixel data read interrupt intended for the body drive control device 214 immediately before outputting the first pixel signal in the field image information. If the image sensor 212 is engaged in cyclical operation, this interrupt occurs cyclically and the body drive control device 214 executes the processing starting in step S300. The interrupt processing operation in step S300 is started up only when the image sensor 212 is engaged in cyclical operation in the sub-sampling read mode.

In step S310, image data are read from the image sensor 212 in the sub-sampling read mode. Namely, if the current interrupt processing is for the first field, the first field image data are read, whereas if the interrupt processing in progress is for the second field, the second field pixel signals are read. In the following step S320, interpolation processing corresponding to the specific field, i.e., either the odd-numbered field or the even-numbered field to which the pixel signals read in step S310 belong, is executed and the image resulting from the interpolation processing is brought up on display at the liquid crystal display element 216 functioning as an EVF.

Figure 20A:
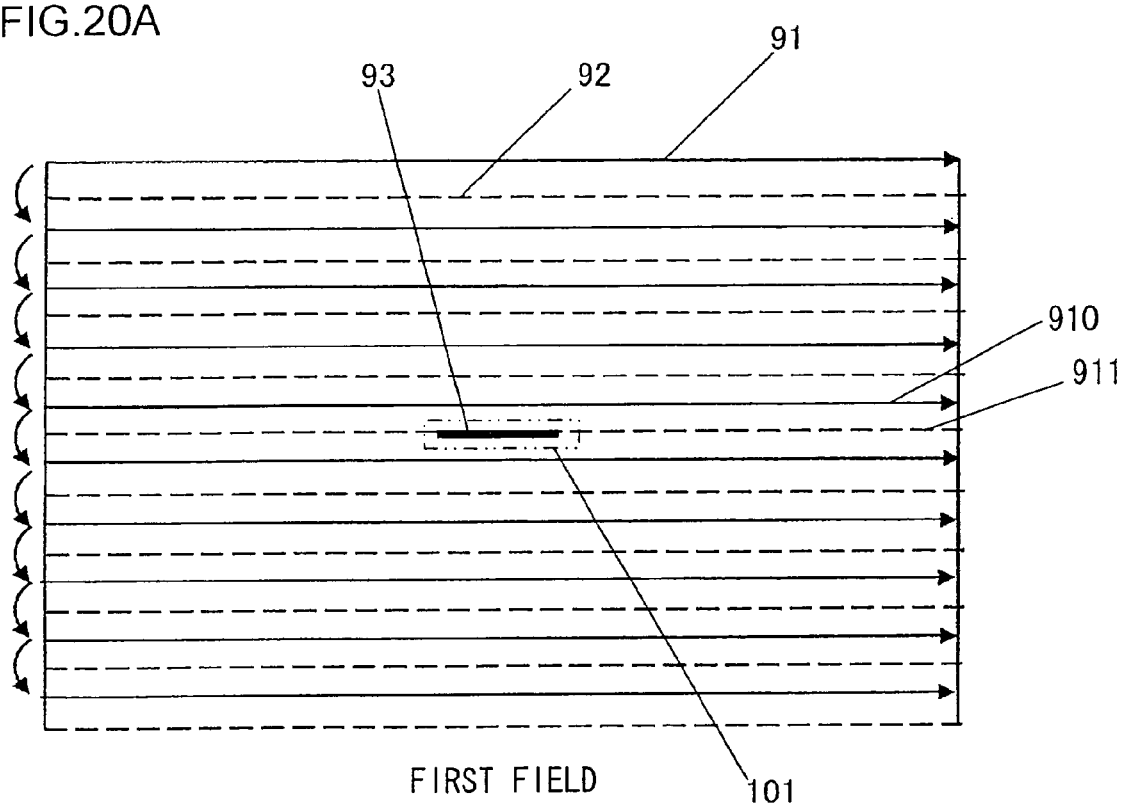
FIG. 20A schematically illustrates the read operation executed to readout pixel signals in the first field.
Figure 20B:
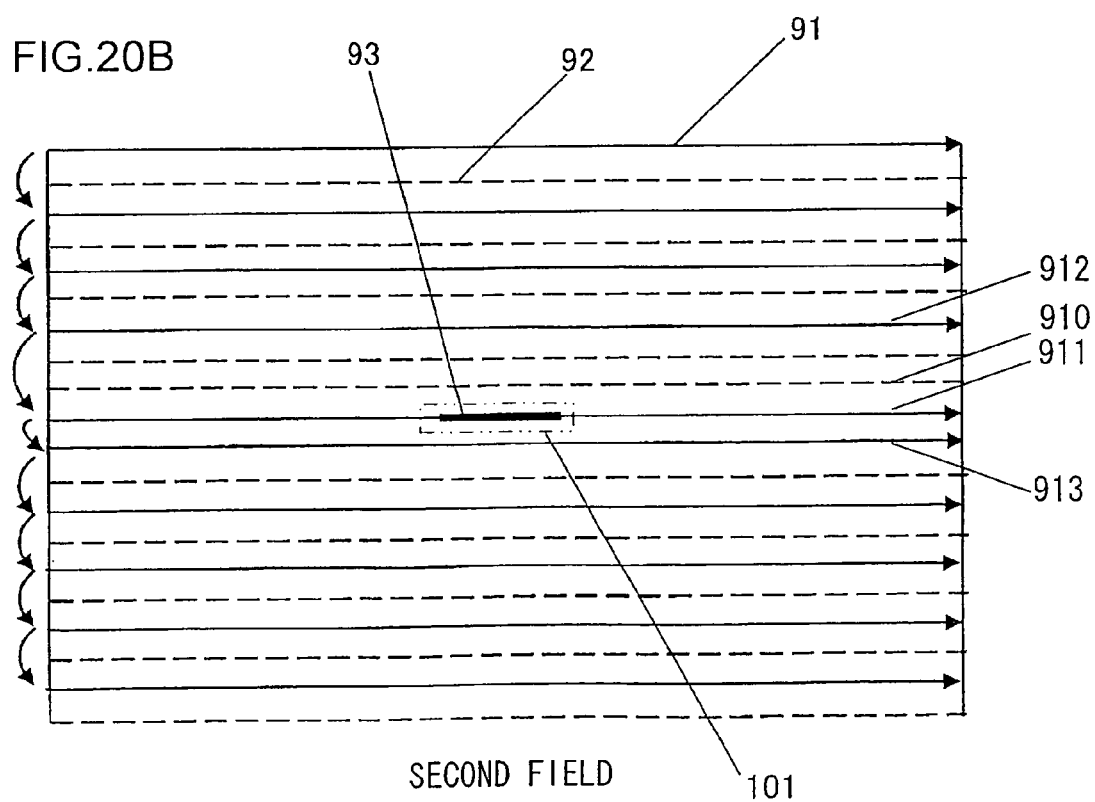
FIG. 20B schematically illustrates the read operation executed to read out pixel signals in the second field.

FIG. 20A schematically illustrates the read operation executed to read out the pixel signals in the first field, whereas FIG. 20B schematically illustrates the read operation executed to read out the pixel signals in the second field. The longitudinal/lateral orientation assumed in these figures corresponds to the vertical/horizontal orientation assumed in the pixel array, with solid lines 91 extending along the lateral direction each indicating a row from which pixel signals are read out through vertical sub-sampling read and dotted lines 92 each indicating a row from which pixel signals are not read out in the vertical sub-sampling read. In each row, the pixel signals are read out along a scanning direction running from the left to the right, whereas the pixel signals are read out from the rows set side by side along the longitudinal direction matching a scanning direction running from the top to the bottom. In addition, a bold line 93 at the center of FIG. 20A indicates an area where the focus detection pixels 313 and 314 are disposed.

In the processing executed in step S320 for the first field read shown in FIG. 20A, an image generated based upon the pixel signals in the specific rows, having been read through the sub-sampling read, is brought up on display at the liquid crystal display element 216. In the second field read shown in FIG. 20B, the row 911 having the focus detection pixels 313 and 314 disposed therein, instead of the row 910 directly above the row 911 where the focus detection pixels 313 and 314 are present, is read, and pixel signals equivalent to those in the row 910 are generated through interpolation executed by adding and averaging the pixel signals belonging to the matching columns and read out from the rows 912 and 913 on the two sides of the row where the focus detection pixels 313 and 314 are present in step S320. Then, an image is displayed at the liquid crystal display element 216 based upon the pixel signals in the rows having been read in the second field and the interpolated pixel signals. It is to be noted that the first field and the second field are distinguished from each other based upon an ID signal generated in a control circuit built into the image sensor.

In step S322, a decision is made as to whether the field for which the processing is underway is the first field or the second field. If it is decided that the processing is in progress for the first field that does not include the focus detection pixels 313 and 314, the operation proceeds to step S370, whereas the operation proceeds to step S330 if it is decided that the processing in progress is being executed for the second field. In step S330, the image shift detection arithmetic processing (correlation arithmetic processing) to be detailed later is executed based upon a pair of data strings (the data strings made up of pixel signals from the focus detection pixels 313 and 314 indicated by the unfilled circles in the example presented in FIG. 12) sampled from the focus detection pixels in the focus detection area 101 (see FIG. 2) so as to calculate the image shift amount indicating the image shift amount manifesting in the focus detection area 101. The image shift amount is then converted to a defocus amount.

In step S340, a decision is made as to whether or not the current condition is close to a focusing state, i.e., whether or not the absolute value of the defocus amount having been calculated is equal to or less than a predetermined value. If it is decided in step S340 that the current condition is not close to the focusing state, the operation proceeds to step S350. In step S350, the defocus amount is transmitted to the lens drive control device 206 to update the information based upon which the focusing lens 210 at the interchangeable lens 202 is driven to the focusing position. Subsequently, the operation proceeds to step S370. It is to be noted that the operation also branches to this step if focus detection is not possible to transmit a scan drive instruction to the lens drive control device 206. In response, the lens drive control device drives the focusing lens 210 at the interchangeable lens 202 to scan between the infinity position and the close-up position. The operation then proceeds to step S370.

Figure 19:
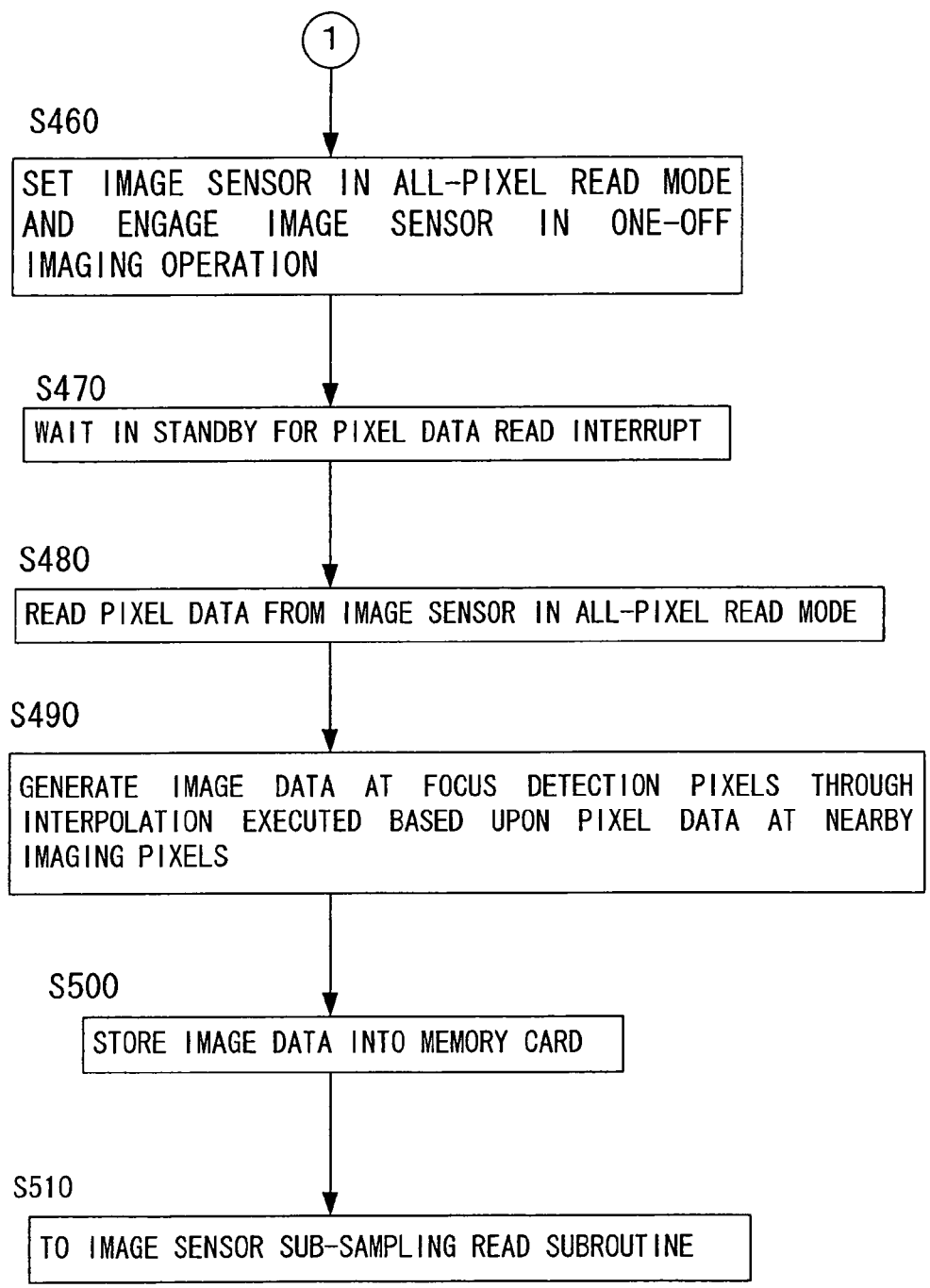
FIG. 19 presents a flowchart of the shutter release sequence operation.

If, on the other hand, it is decided in step S340 that the current condition is close to the focusing state, the operation proceeds to step S360 to make a decision as to whether or not a shutter release has occurred in response to a shutter release operation. If it is decided that a shutter release has not occurred, the operation proceeds to step S370, whereas if it is decided that a shutter release has occurred, the shutter release sequence operation shown in FIG. 19 is executed. In step S370, the operation returns from the pixel data read interrupt processing to step S220 in the sub-sampling read mode subroutine in FIG. 17 and waits in standby for the pixel data read interrupt in the next cycle. It is to be noted that the length of time required to execute steps S300 S360 in the pixel data read interrupt processing is smaller than the length of cycles over which pixel data read interrupts occur.

FIG. 19 presents a flowchart of the shutter release sequence operation. In step S460, the image sensor 212 is set in the all-pixel read mode and is engaged in a one-off imaging operation in the all-pixel read mode. In step S470, the operation waits in standby for a pixel data read interrupt. As a pixel data read interrupt occurs, the pixel signals output from the image sensor 212 are read in the following step S480. In step S490, pixel signals at positions occupied by the focus detection pixels 313 and 314 are generated through interpolation executed by using the pixel signals at the imaging pixels 310 present around the focus detection pixels 313 and 314. In step S500, the pixel signals from the imaging pixels 310 and the interpolated signals are stored as image data into the memory card 219. In step S510, the operation jumps to the sub-sampling read mode subroutine shown in FIG. 17 to set the image sensor 212 in the sub-sampling read mode again and start an imaging operation in the sub-sampling read mode again.

Next, the image shift detection arithmetic processing (correlation arithmetic processing) executed in step S330 in FIG. 18 is described in detail. Since the amounts of light in the pair of images detected by the focus detection pixels 313 and 314 may not be in balance due to vignetting of the focus detection pupils by the lens aperture opening, a specific type of correlation operation that assures the required level of image shift detection accuracy even when the light amounts are not in balance is executed. A correlation quantity C(k) indicating the level of correlation is calculated as expressed in (1), through the correlation operation executed on a pair of data strings ($A1_1, \ldots, A1_M, A2_1 \ldots A2_M$: M indicates the number of sets of data) read out from the focus detection pixel row.

$$C(k) = \Sigma |A1_n \cdot A2_{n+1+k} - A2_{n+k} \cdot A1_{n+1}| \qquad (1)$$

In expression (1), the $\Sigma$ operation is cumulatively executed with regard to n and the range assumed for n is limited to the range over which the data $A1_n, A1_{n+1}, A2_{n+k}$ and $A2_{n+1+k}$ exist in correspondence to the image shift amount k. The image shift amount k is an integer which represents a relative shift amount assuming a value taken in units matching the data interval with which the data in the data strings are sampled.

Figure 21A:
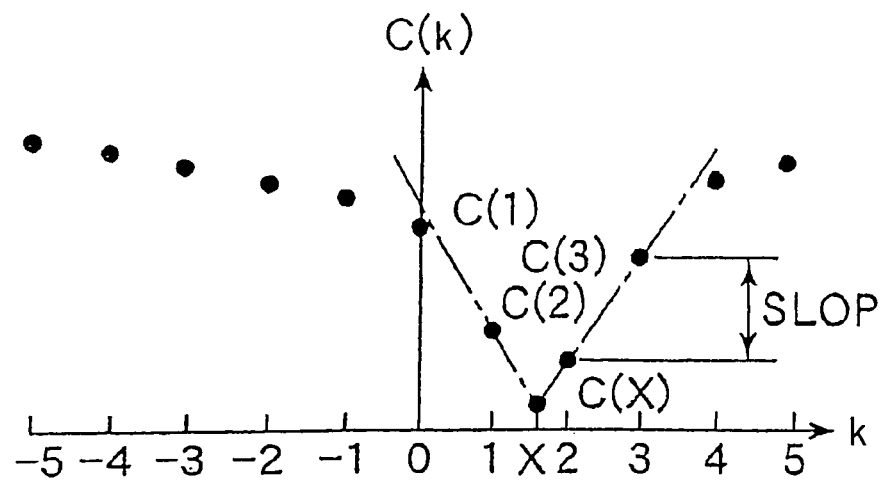
FIGS. 21A~21C illustrate a method that may be adopted when judging the results of image shift detection arithmetic processing (correlation arithmetic processing)

The results of the arithmetic operation executed as expressed in (1) yield a correlation quantity C(k) assuming the smallest value at the shift amount at which the pair of sets of data achieve a high level of correlation (when $k=k_j=2$ in FIG. 21A). The correlation quantity C(k) assumes a smaller value when the level of correlation is higher. The shift amount x, which gives the smallest value C(x) in the continuous correlation quantity graph, is then determined by adopting a three-point interpolation method expressed in (2)~(5) below.

$$x = k_j + D/\text{SLOP} \qquad (2)$$

$$C(x) = C(k_j) - |D| \qquad (3)$$

$$D = \{C(k_j - 1) - C(k_j + 1)\}/2 \qquad (4)$$

$$\text{SLOP} = \text{MAX}\{C(k_j + 1) - C(k_j), C(k_j - 1) - C(k_j)\} \qquad (5)$$

Figure 21B:
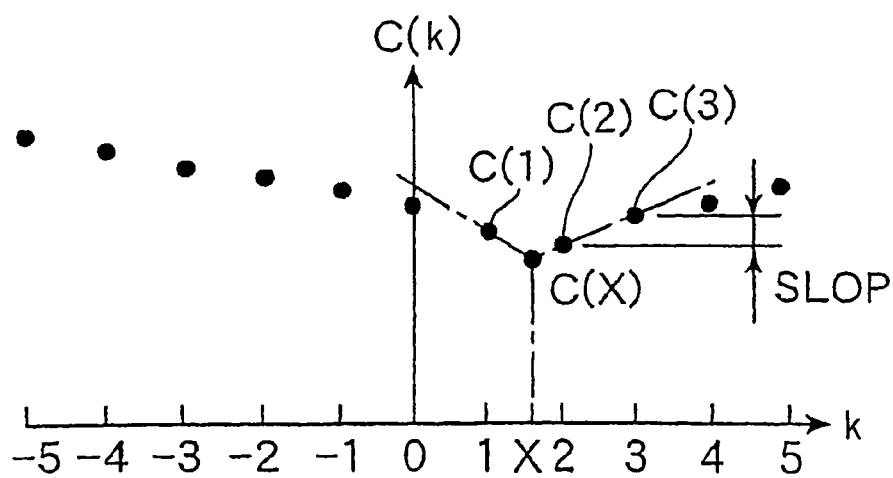

The judgment as to whether or not the shift amount x calculated as expressed in (2) is reliable is made as follows. As shown in FIG. 21B, the interpolated minimum value C(x) of the correlation quantity increases when the level of correlation between the pair of sets of data is lower. Accordingly, if C(x) is equal to or greater than a predetermined threshold value, the calculated shift amount is judged to be less reliable and the calculated shift amount x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift amount should be judged to be not reliable and accordingly, the calculated shift amount x should be canceled.

Figure 21C:
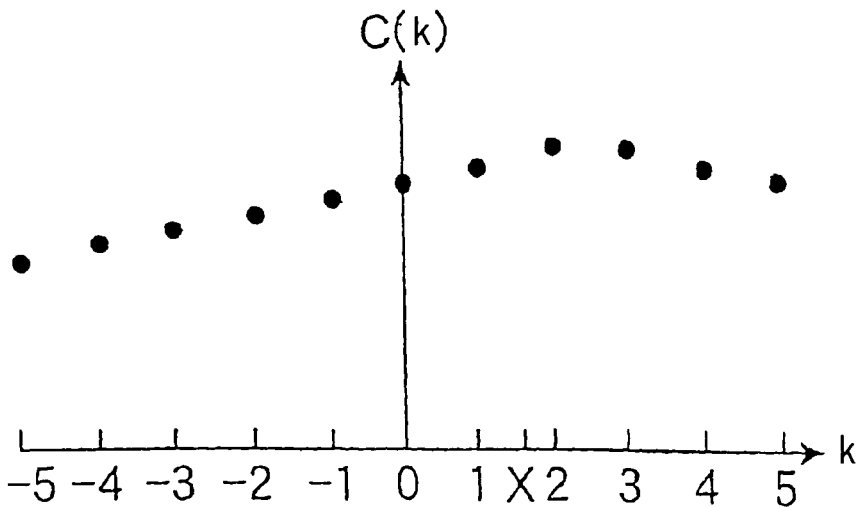

As a further alternative, if SLOP indicating the value in proportion to the contrast is equal to or less than a predetermined value, the subject should be judged to be a low-contrast subject. Accordingly, the reliability of the calculated shift amount should be judged to be low and the calculated shift amount x should be canceled. If the level of correlation between the pair of sets of data is low and the correlation quantity C(k) does not dip at all over the shift range $k_{min}$ to $k_{max}$, as shown in FIG. 21C, the minimum value C(x) cannot be determined. In this case, it is decided that focus detection cannot be executed.

It is to be noted that the correlation quantity C(k) may be calculated through a correlation operation other than that expressed in (1), as long as the required level of image shift detection accuracy is assured even when the range-finding pupils are vignetted by the lens aperture opening and the light amounts are not in balance.

If the calculated shift amount x is judged to be reliable, the calculated shift amount is converted to an image shift amount shft, as expressed in (6).

PY in expression (6) represents the detection pitch. The image shift amount calculated as expressed in (6) is then converted to a defocus amount def by multiplying the image shift amount by a predetermined conversion coefficient k, as expressed in (7) below.

$$shft = PY \cdot x \quad (6)$$

$$def = k \cdot shft \quad (7)$$

In the first embodiment described above, the read of the image information in the first field and the read of the image information and the focus detection pixel signals in the second field are cyclically executed in the sub-sampling read mode, without switching the scanning patterns determined with the various control signals provided by the vertical scanning circuit 502, the first horizontal scanning circuit 521, the second horizontal scanning circuit 522 and the reset circuit 504. For instance, the first horizontal scanning circuit 521 and the second horizontal scanning circuit 522 are horizontal scanning circuits that output scanning signals so as to achieve a specific pattern and first field signals and second field signals are generated by switching the switches SW1~SW8. This means that the operation executed in the embodiment does not require a period of time during which the settings must be adjusted to switch the scanning patterns, differentiating it from an operation in which the image information is read out through sub-sampling summing and the focus detection pixel signals are successively read out by switching the scanning patterns via the vertical scanning circuit 502, the first horizontal scanning circuit 521, the second horizontal scanning circuit 522 and the reset circuit 504. As a result, the first field and the second field are switched without creating any dead frame and the image information display and the focus detection can be executed over uniform cycles.

It is to be noted that while FIG. 15 illustrates a read sequence through which the first field read and the second field read are alternately executed, a read sequence in which each second field read follows a plurality of first field reads may be executed instead. In such a case, the image information read out through the second field read, too, may be used for display to eliminate any dead time that might otherwise occur when switching from the first field to the second field and vice versa. As a result, the image display will be updated over completely uniform cycles, with no disruption in the display cycles. Thus, even when the subject is moving, a subject image showing smooth motion of the subject will be brought up on display.

Second Embodiment

Figure 22:
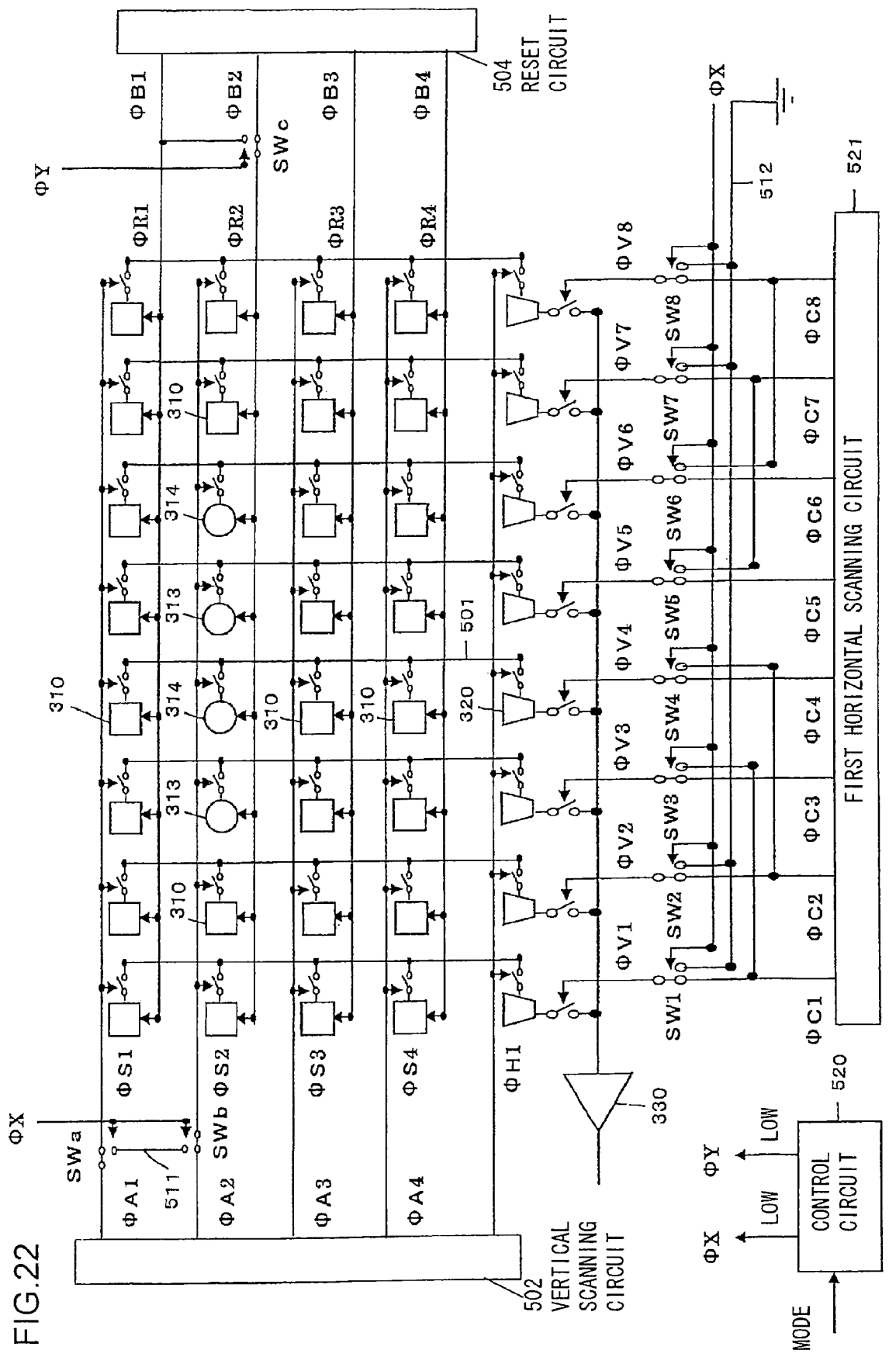
FIG. 22 is a conceptual diagram of the circuit structure at the image sensor 212 achieved in a second embodiment engaged in the all-pixel read.
Figure 23:
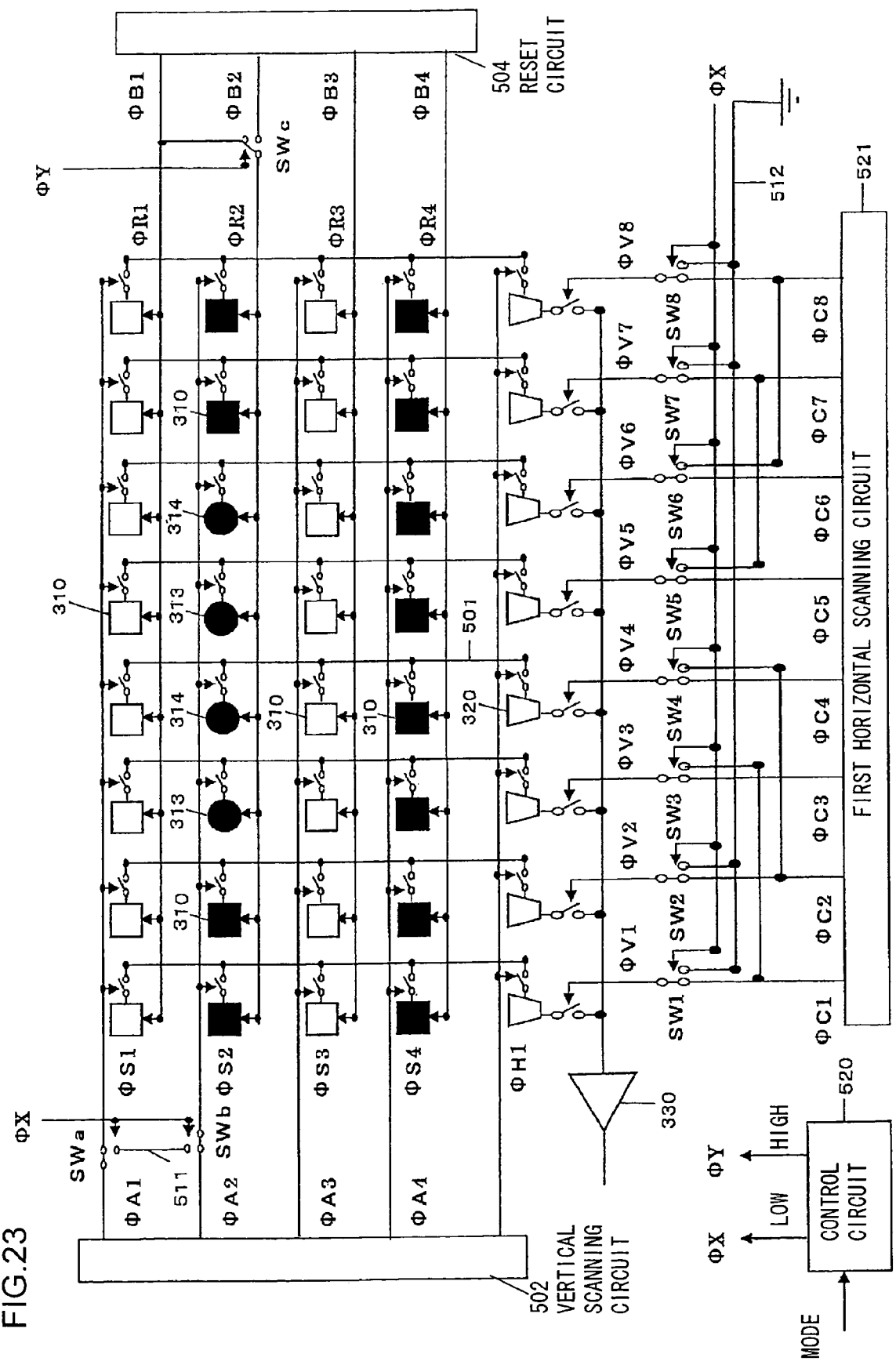
FIG. 23 is a conceptual diagram of the circuit structure at the image sensor 212 in the second embodiment engaged in the sub-sampling read mode for reading out pixel signals in the first field.
Figure 24:
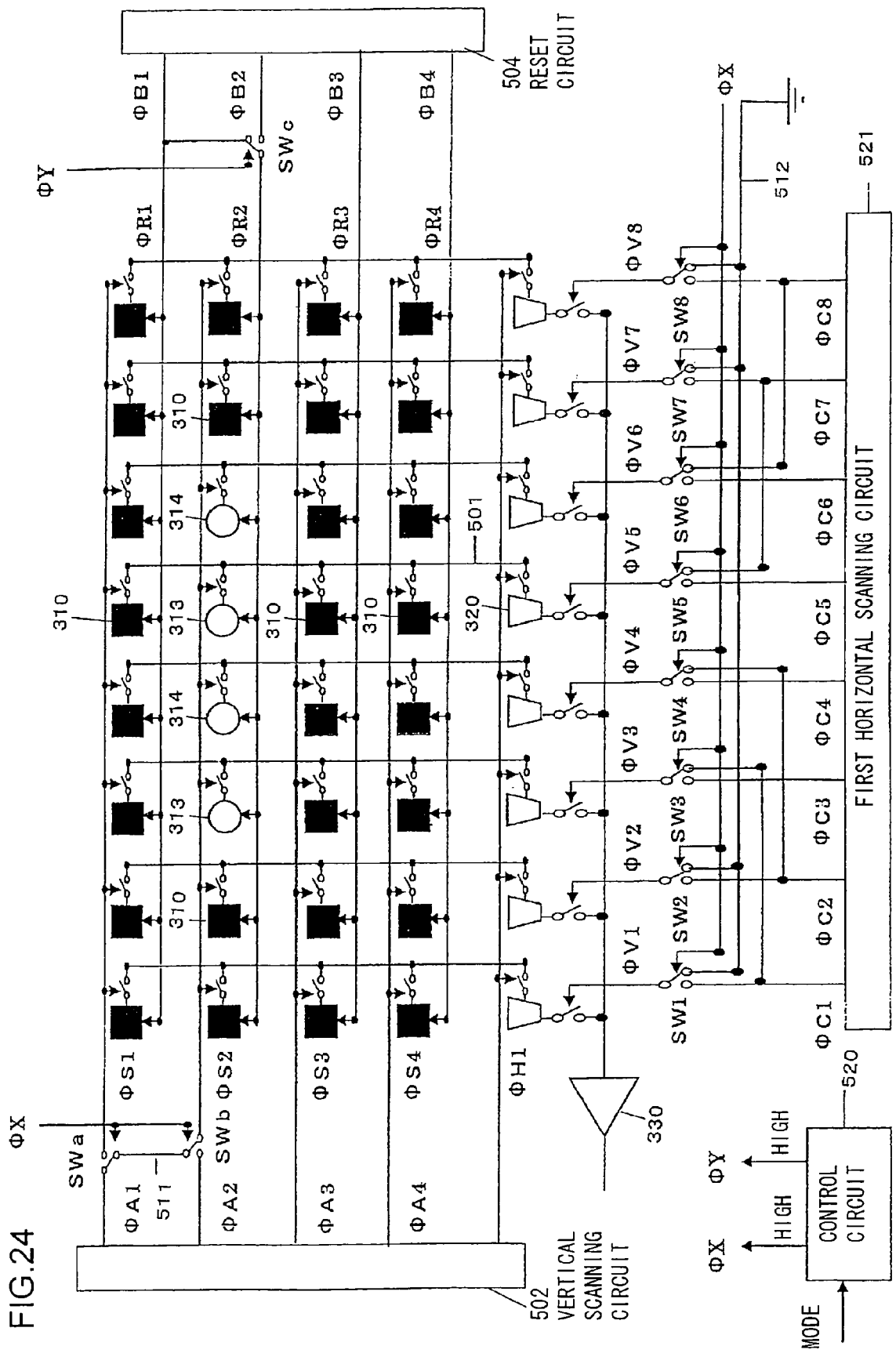
FIG. 24 is a conceptual diagram of the circuit structure at the image sensor 212 in the second embodiment engaged in the sub-sampling read mode for reading out pixel signals in the second field.

FIGS. 22 through 24 each present a conceptual diagram showing the circuit structure adopted in the image sensor 212 in the second embodiment. It is to be noted that the same reference numerals are assigned to components identical to those in the circuit structure shown in FIGS. 10 through 12. The image sensor 212 in the embodiment is constituted with a CMOS image sensor. FIGS. 22 through 24, as do FIGS. 10 through 12, show the image sensor 212 with an eight pixel (across) by four pixel (down) layout in simplified illustrations.

The second embodiment includes a first horizontal scanning circuit 521 alone to be used for horizontal scanning. The signal lines for scanning signals ØC1~ØC8 generated by the first horizontal scanning circuit 521 and a ground line 512 are selectively connected to the signal lines for the control signals ØV1~ØV8 via the switches SW1~SW8. The switches SW1~SW8 are switched by the control signal ØX provided from the control circuit 520 and when the control signal ØX is at low, the signal lines for the scanning signals and the control signals are connected so as to achieve a state expressed as; ØV1=ØC1, ØV2=ØC2, ØV3=ØC3, ØV4=ØC4, ØV5=ØC5, ØV6=ØC6, ØV7=ØC7 and ØV8=ØC8. When the control signal ØX is at high, on the other hand, the ground line 512 and the signal lines for the control signals ØV1~ØV8 are connected so as to achieve a state expressed as; ØV1=GND (low), ØV2=GND, ØV3=ØC1, ØV4=ØC2, ØV5=ØC7, ØV6=ØC8, ØV7=GND and ØV8=GND.

The image sensor 212 in the second embodiment, too, is engaged in operation in either of the two operation modes, i.e., the all-pixel read mode and the sub-sampling read mode. In the all-pixel read mode, the image information for a full frame is read out at once. In the sub-sampling read mode, on the other hand, image information corresponding to a frame is read out through time-sharing as two sets of sub-sampled image information corresponding to a first field and a second field. FIG. 22 shows the image sensor set in the all-pixel read mode, whereas FIGS. 23 and 24 each show the image sensor set in the sub-sampling read mode.

When the image sensor 212 is set in the all-pixel read mode, the rows are scanned continuously along the vertical direction while continuous column scanning along the horizontal direction is in progress. When the image sensor 212 is set in the sub-sampling read mode, rows are scanned along the vertical direction by skipping the row where the focus detection pixels 313 and 314 are present and sub-sampling summing is executed along the horizontal direction for the column scanning in correspondence to the first field. In addition, rows are scanned along the vertical direction through sub-sampled row scanning without skipping the row where the focus detection pixels 313 and 314 are present in correspondence to the second field. For the column scanning executed along the horizontal direction, a continuous read is executed for the row containing the focus detection pixels 313 and 314 whereas horizontal sub-sampling summing is executed for the rows that do not include focus detection pixels 313 and 314.

When the image sensor 212 is set in the sub-sampling read mode, the vertical scanning circuit 502, the reset circuit 504 and the first horizontal scanning circuit 521 execute identical operations for the first field and second field. Namely, either in the first field or the second field, the vertical scanning circuit 502, the reset circuit 504 and the first horizontal scanning circuit 521 respectively generate scanning signals ØA1~ØA4, scanning signals ØB1~ØB4 and scanning signals ØC1~ØC8 with identical patterns. Scanning patterns determined in relation to the pixel control signals (ØS1~ØS4, ØR1~ØR4 and ØV1~ØV8) for the first field and the second field are switched simply by switching the switches SWa, SWb, SWc and SW1~SW8 via the control signals ØX and ØY generated at the control circuit 520. It is to be noted that the control circuit 520 outputs an ID signal, used to identify the pixel signals output in the sub-sampling read mode as either the first field signals or the second field signals, to the outside.

Figure 25:
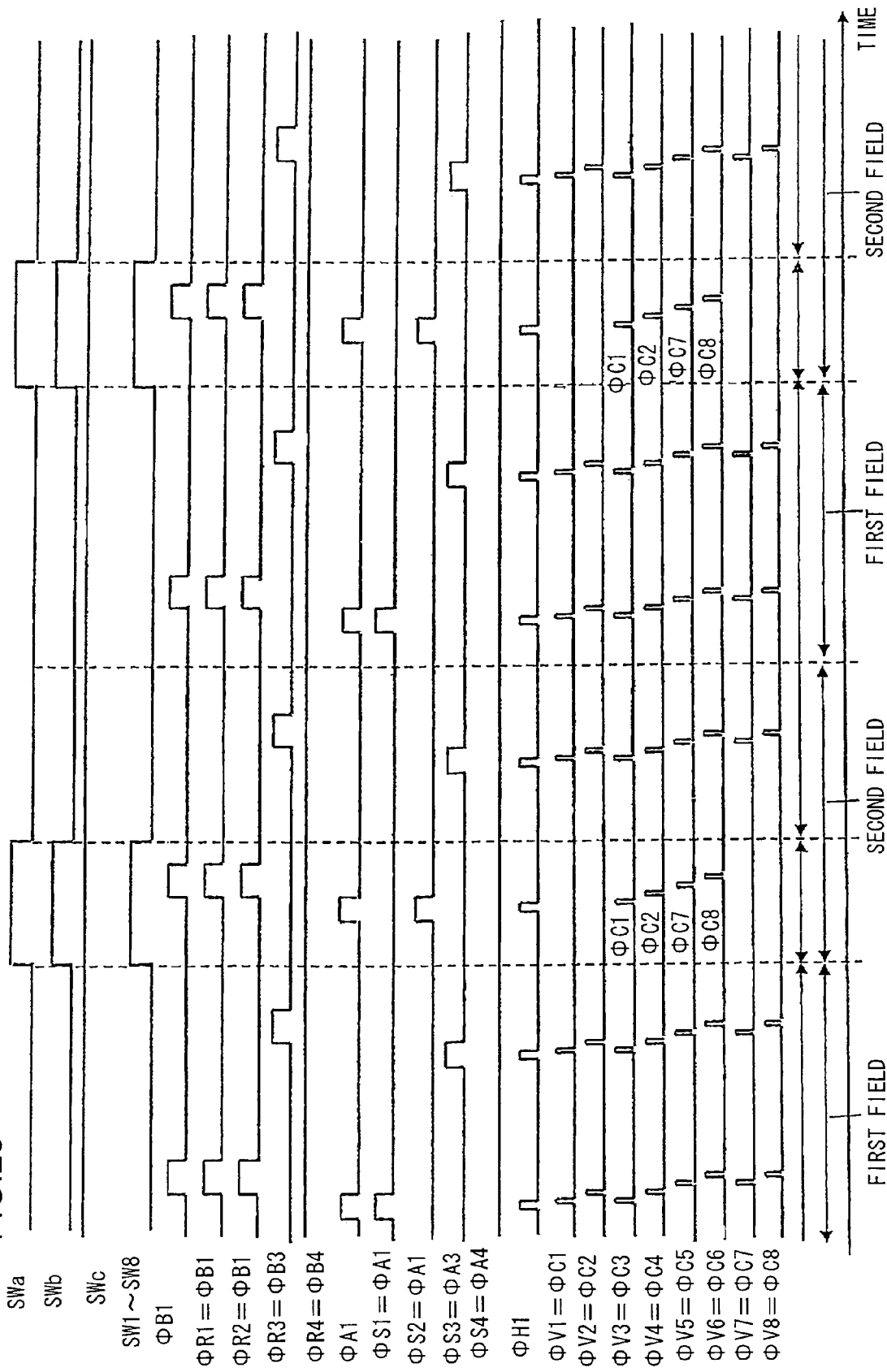
FIG. 25 is an operation timing chart of the operation executed at the image sensor 212 in the second embodiment in the sub-sampling read mode.

FIG. 25 is a timing chart of the operation executed at the image sensor 212 in the sub-sampling read mode. It is to be noted that the image sensor set in the all-pixel read mode engages in operation as shown in the timing chart in FIG. 14, with the control circuit 520 sustaining the control signals ØX and ØY at low level in response to the instruction in the Mode signal input from the outside. Accordingly, the operation executed in the all-pixel read mode is not repeatedly explained and the following explanation, given in reference to the timing chart in FIG. 25, focuses on the operation executed in the sub-sampling read mode. In the sub-sampling read mode, the first field read and the second field read are alternately executed repeatedly, as shown in FIG. 25.

For the first field read, the control circuit 520 sets the control signal ØX to low and the control signal ØY to high, as shown in FIG. 23. As the control signal ØX shifts to low, the signal line for the scanning signal ØA1 and the signal line for the control signal ØS1 become connected with each other via the switch SWa and the signal line for the scanning signal ØA2 and the signal line for the control signal ØS2 become connected with each other via the switch SWb. Namely, the state expressed as; ØA1=ØS1 and ØA2=ØS2, is achieved. In addition, via the switches SW1~SW8, the signal lines for the scanning signals ØC1~ØC8 become connected to the signal lines for the control signals ØV1~ØV8 and thus, the state expressed as; ØC1=ØV1, ØC2=ØV2, ØC3=ØV3, ØC4=ØV4, ØC5=ØV5, ØC6=ØV6, ØC7=ØV7 and ØC8=ØV8, is achieved. As the control signal ØY is set to high, the signal line for the scanning signal ØB1 and the signal line for the control signal ØR2 become connected with each other and the state expressed as; ØB1=ØR2, is achieved.

As shown in FIG. 23, the imaging pixels 310 in the first row are selected by the control signal ØS1 (=ØA1) provided from the vertical scanning circuit 502 and the pixel signals at the selected imaging pixels 310 are output to the vertical signal lines 501. The pixel signals from the first row, output to the vertical signal lines 501, are temporarily held in the line memories 320 based upon the instruction in the control signal ØH1 generated in synchronization with the control signal ØS1. The pixel signals originating at the imaging pixels 310 in the first row and held in the line memories 320 are transferred to the output circuit 330 in response to the control signals ØV1~ØV8 (match the scanning signals ØC1~ØC8) provided from the first horizontal scanning circuit 521. The pixel signals are then amplified at a preselected amplification factor at the output circuit 330 before they are output to the outside.

In the scanning pattern determined by the control signals ØV1~ØV8, similar to that shown in FIG. 15, the pixel signal at the imaging pixel 310 in the first column and the pixel signal at the imaging pixel 310 in the third row are added up, the pixel signal at the imaging pixel 310 in the second column and the pixel signal at the imaging pixel 310 in the fourth column are added up, the pixel signal at the imaging pixel 310 in the fifth column and the pixel signal at the imaging pixel 310 belonging to the seventh column are added up and the pixel signal at the imaging pixel in the sixth column and the pixel signal from the imaging pixel in the eighth column are added up in this order, as shown in FIG. 25. The number of pixel signal outputs from the first row is four, significantly fewer than the eight pixel signals read out and output in succession.

Once the transfer of the pixel signals from the first-row imaging pixels 310 to the line memories 320 ends, the imaging pixels 310 in the first row and the imaging signals 310 and the focus detection pixels 313 and 314 in the second row are reset in response to the control signals ØR1 and ØR2 (=ØB1) provided from the reset circuit 504 and subsequent electrical charge at the imaging pixels 310 in the first row and the imaging pixels 310 and the focus detection pixels 313 and 314 in the second row starts with the timing of the trailing edge of the control signals ØR1 and ØR2.

Once the output circuit 330 finishes outputting the pixel signals originating at the first-row imaging pixels 310, the imaging pixels 310 in the third row are selected by the control signal ØS3 (=ØA3) provided from the vertical scanning circuit 502 and the pixel signals from the selected imaging pixels 310 are output to the vertical signal lines 501. The pixel signals from the third row, output to the vertical signal lines 501, are temporarily held in the line memories 320 in response to the control signal SH1 generated in synchronization with the control signal ØS3. The pixel signals originating at the imaging pixels 310 in the third row and held in the line memories 320 undergo sub-sampling summing similar to that executed for the first row in response to the control signals ØV1~ØV8 (match the scanning signals ØC1~ØC8) generated at the first horizontal scanning circuit 521, the sums are transferred to the output circuit 330 and the sums amplified at the predetermined amplification factor at the output circuit 330 are ultimately output to the outside.

Once the transfer of the pixel signals from the third-row imaging pixels 310 to the line memories 320 ends, the imaging pixels 310 in the third row are reset in response to the control signal ØR3 (=ØB3) provided from the reset circuit 504 and subsequent electrical charge at the imaging pixels 310 in the third row starts with the timing of the trailing edge of the control signal ØR3. The first field pixel signal read operation is thus completed.

The operation then shifts into the second field pixel signal read. Once the output of the pixel signals at the imaging pixels 310 in the third row in the first field via the output circuit 330 ends, the control circuit 520 sets the control signal ØX to high and the control signal ØY to high.

As shown in FIG. 24, when the control signal ØX is at high, the signal line for the scanning signal ØA1 and the signal line 511 are connected via the switch SWa and also the signal line 511 is connected to the signal line for the control signal ØS2 via the switch SWb. Namely, the state expressed as; ØA1=ØS2, is achieved. In addition, the switches SW1~SW8 are switched over from the settings shown in FIG. 23 to the settings in FIG. 24 and, as a result, the state expressed as "ØV1=GND, ØV2=GND, ØV3=ØC1, ØV4=ØC2, ØV5=ØC7, ØV6=ØC8, ØV7=GND and ØV8=GND is achieved. As the control signal ØY is set to high, the signal line for the scanning signal ØB1 and the signal line for the control signal ØR2 become connected with each other and the state expressed as; ØB1=ØR2, is achieved.

For the second field read, the imaging pixels 310 and the focus detection pixels 313 and 314 in the second row, instead of the imaging pixels in the first row, are selected by the control signal ØS2 (=ØA1) provided from the vertical scanning circuit 502. The pixel signals from the selected imaging pixels 310 and focus detection pixels 313 and 314 are output to the vertical signal lines 501. The pixel signals from the imaging pixels 310 and the focus detection pixels 313 and 314 in the second row, output to the vertical signal lines 501, are then temporarily held in the line memories 320 in response to the control signal ØH1 generated in synchronization with the control signal ØS2.

The pixel signals originating at the imaging pixels 310 in the second row and held in the line memories 320 are transferred to the output circuit 330 in response to the control signals ØV1~ØV8. The pixel signals are then amplified at the preselected amplification factor at the output circuit 330 before they are output to the outside. While control signal pulses are generated in succession one at a time in the scanning pattern determined with the control signals ØV1~ØV8, as in the scanning pattern in the all-pixel read mode, only control signals ØV3~ØV6 are generated. As a result, the pixel signals from the four focus detection pixels 313 and 314 are output in succession without being added together. Since the number of outputs from the second row in the second field and the number of outputs from the first row in the first field are both four and thus equal to each other, the pixel signals can be read out through identical sequences without inducing any disruption in the output operation timing.

Once the transfer of the pixel signals from the second row to the line memories 320 ends, the imaging pixels 310 in the first row and the imaging signals 310 and the focus detection pixels 313 and 314 in the second row are reset in response to the control signals ØR1 and ØR2 (=ØB1) provided from the reset circuit 504 and subsequent electrical charge at the imaging pixels 310 in the first row and the imaging pixels 310 and the focus detection pixels 313 and 314 in the second row starts with the timing of the trailing edge of the control signals ØR1 and ØR2.

As the output of the pixel signals from the second row via the output circuit 330 ends, the control signal 520 sets the control signal ØX to low and the control signal ØY to high, as shown in FIG. 23. As a result, a state identical to that achieved in the first field read, expressed as; ØA1=ØS1 and ØA2=ØS2, ØC1=ØV1, ØC2=ØV2, ØC3=ØV3, ØC4=ØV4, ØC5=ØV5, ØC6=ØV6, ØC7=ØV7, ØC8=ØV8 and ØB1=ØR2, is achieved.

Once this state is achieved, the pixel signals from the third row are immediately output. The imaging pixels 310 in the third row are selected by the control signal ØS3 (=ØA3) provided from the vertical scanning circuit 502 and the pixel signals at the selected imaging pixels 310 are output to the vertical signal lines 501. The pixel signals from the third row, output to the vertical signal lines 501, are temporarily held in the line memories 320 based upon the instruction in the control signal ØH1 generated in synchronization with the control signal ØS3. The pixel signals originating at the imaging pixels 310 in the third row and held in the line memories 320 then undergo sub-sampling summing as those in the first row and the third row during the first field read and the sums are transferred to the output circuit 330 in response to the control signals ØV1~ØV8 (match the scanning signals ØC1~ØC8) provided from the first horizontal scanning circuit 521. The pixel signal sums are then amplified at the preselected amplification factor at the output circuit 330 before they are output to the outside.

Once the transfer of the pixel signals from the third-row imaging pixels 310 to the line memories 320 ends, the imaging pixels 310 in the third row are reset in response to the control signal (=ØB3) provided from the reset circuit 504 and subsequent electrical charge at the imaging pixels 310 in the third row starts with the timing of the trailing edge of the control signal ØR3. The second field pixel signal read operation is thus completed and then the first field pixel signal read operation resumes, during which the operation described earlier is cyclically executed. It is to be noted that the flow of the operation executed in the digital still camera, identical to that in the first embodiment, is not repeatedly described.

In the second embodiment described above, too, the read of the image information in the first field and the read of the image information and the focus detection pixel signals in the second field are cyclically executed in the sub-sampling read mode, without switching the scanning patterns determined with the various control signals provided by the vertical scanning circuit 502, the first horizontal scanning circuit 521 and the reset circuit 504. In other words, the operation executed in the embodiment does not require a period of time during which the settings must be adjusted to switch the scanning patterns, differentiating it from an operation in which the image information is read out through sub-sampling summing and the focus detection pixel signals are successively read out by switching the scanning patterns via the vertical scanning circuit 502, the first horizontal scanning circuit 521 and the reset circuit 504. As a result, the first field and the second field are switched without creating any dead frame and the image information display and the focus detection can be executed over uniform cycles.

It is to be noted that while FIG. 25 illustrates a read sequence through which the first field read and the second field read are alternately executed, a read sequence in which each second field read follows a plurality of first field reads may be executed instead. In such a case, the image information read out through the second field read, too, may be used for display to eliminate any dead time that might otherwise occur when switching from the first field to the second field and vice versa. As a result, the image display will be updated over completely uniform cycles, with no disruption in the display cycles. Thus, even when the subject is moving, a subject image showing smooth motion of the subject will be brought up on display.

In the first and second embodiments described above, the pixel data at the imaging pixels in the image sensor 212 are scanned through sub-sampling row read executed along the vertical direction and also through sub-sampling summing executed along the horizontal direction without adjusting the settings at the first horizontal scanning circuit 521 in the image sensor 212. As a result, live view display can be provided based upon the image information in the individual fields and, at the same time, focus detection can be executed promptly based upon the pixel data from the focus detection pixels obtained through the second field read.

In addition, by adopting the second embodiment, which differs from the first embodiment in that it does not require the second horizontal scanning circuit 522, the structure of the image sensor 212 can be simplified. It is to be noted that the vertical sub-sampling read and the horizontal thinning read do not need to be executed at the ratio of 2:1. Instead, they may be executed over a discrimination interval ratio of 3:1 or another ratio. In addition, while the operation immediately shifts into an imaging operation as soon as a shutter release occurs in the shutter release sequence in FIG. 19, the imaging operation may be executed after first reading out the pixel data from the successive focus detection pixels through an all-pixel read (or a partial read) prior to the imaging operation and then accurately adjusting the focusing condition through focus detection and focus adjustment executed based upon the pixel data thus read out.

Figure 26:
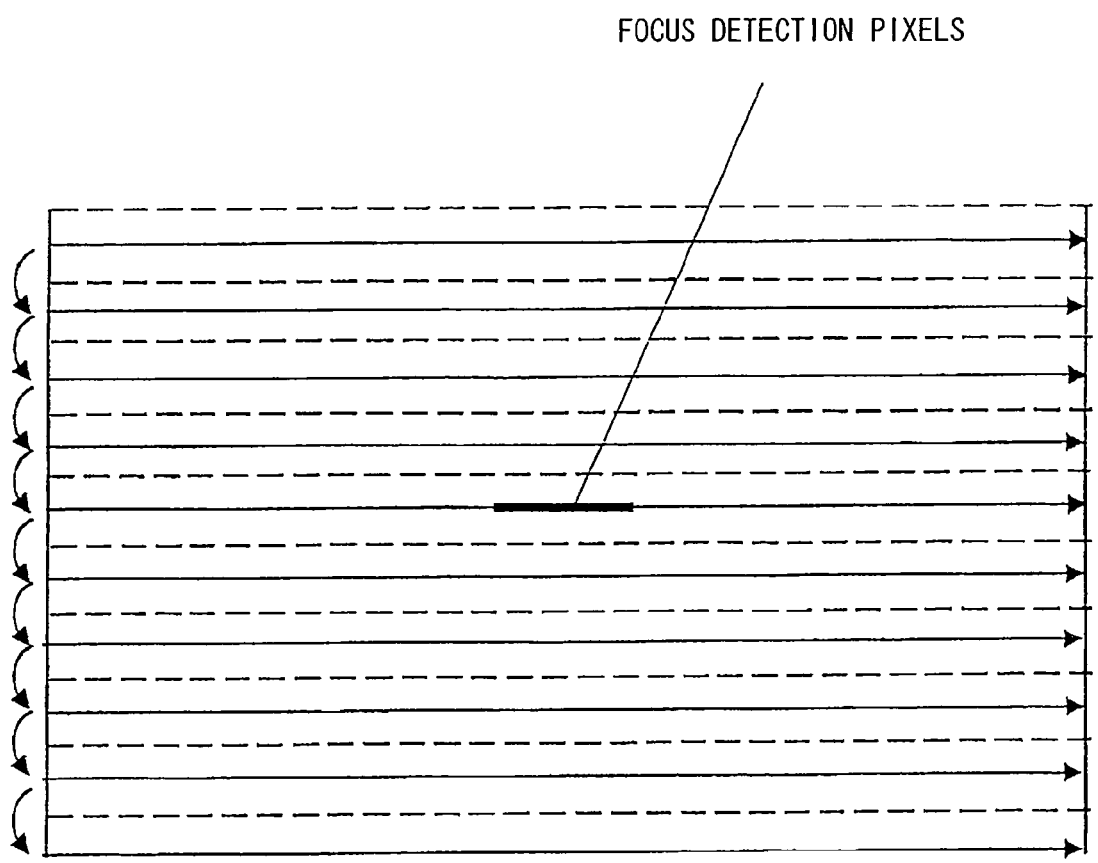
FIG. 26 presents another example of a read operation that may be executed in the sub-sampling read mode for reading out pixel signals in the second field.

Furthermore, while the row having the focus detection pixels disposed therein is selected in place of the adjacent imaging pixel row in the second field pixel data read operation executed in the sub-sampling read mode shown in FIG. 20B, the positions of the rows skipped in the vertical read may be each shifted by a single row, as shown in FIG. 26.

Third Embodiment

Figure 27:
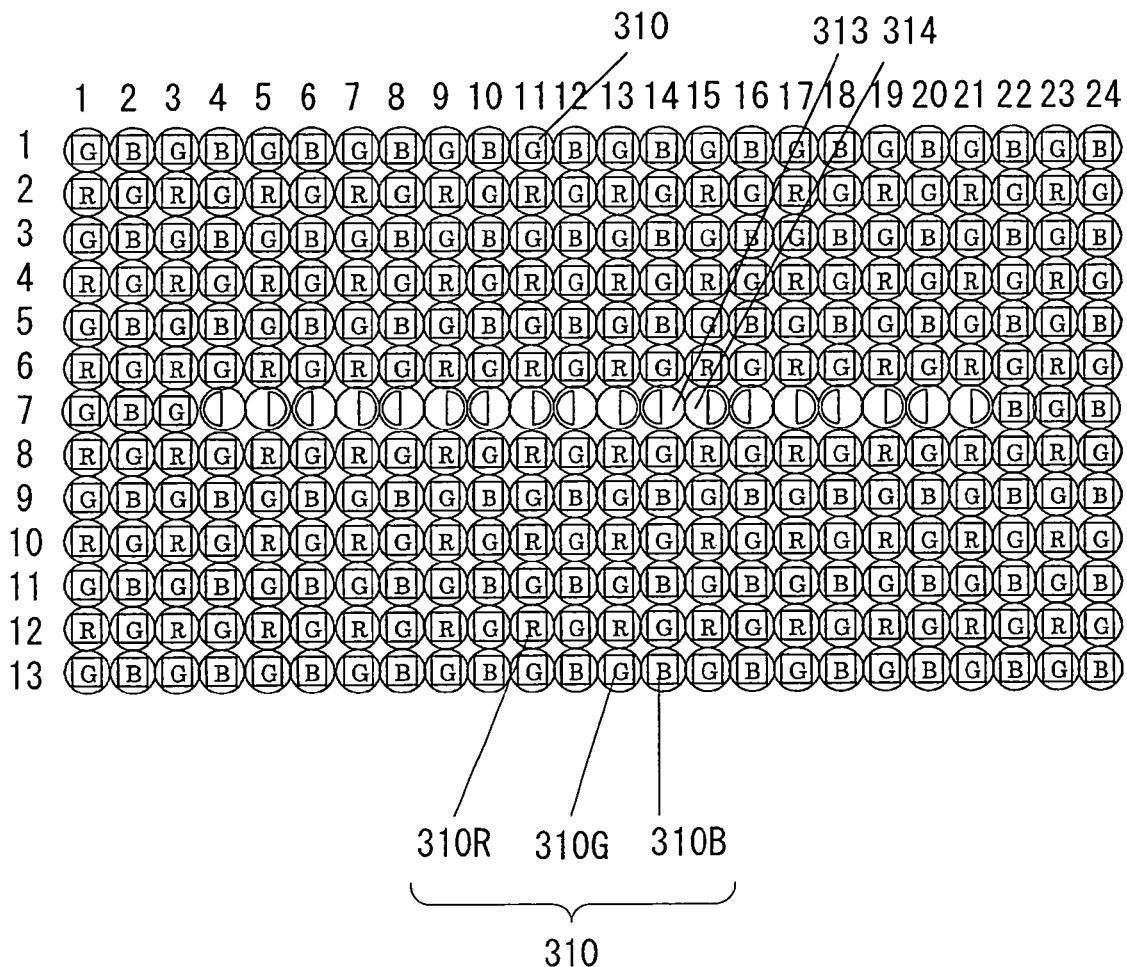
FIG. 27 is a front view showing in detail the structure of a color image sensor 212.

The image sensor 212 achieved in the third embodiment is a color image sensor. FIG. 27 is a front view showing in detail the structure adopted in the color image sensor 212 in an enlargement of an area around the focus detection area 101 in FIG. 2. The color image sensor differs from the image sensor 212 in FIG. 3 in that color filters are disposed at the imaging pixels 310. The focus detection pixels 313 and 314 assume structures identical to those in the image sensor 212 in FIG. 3.

Figure 28:
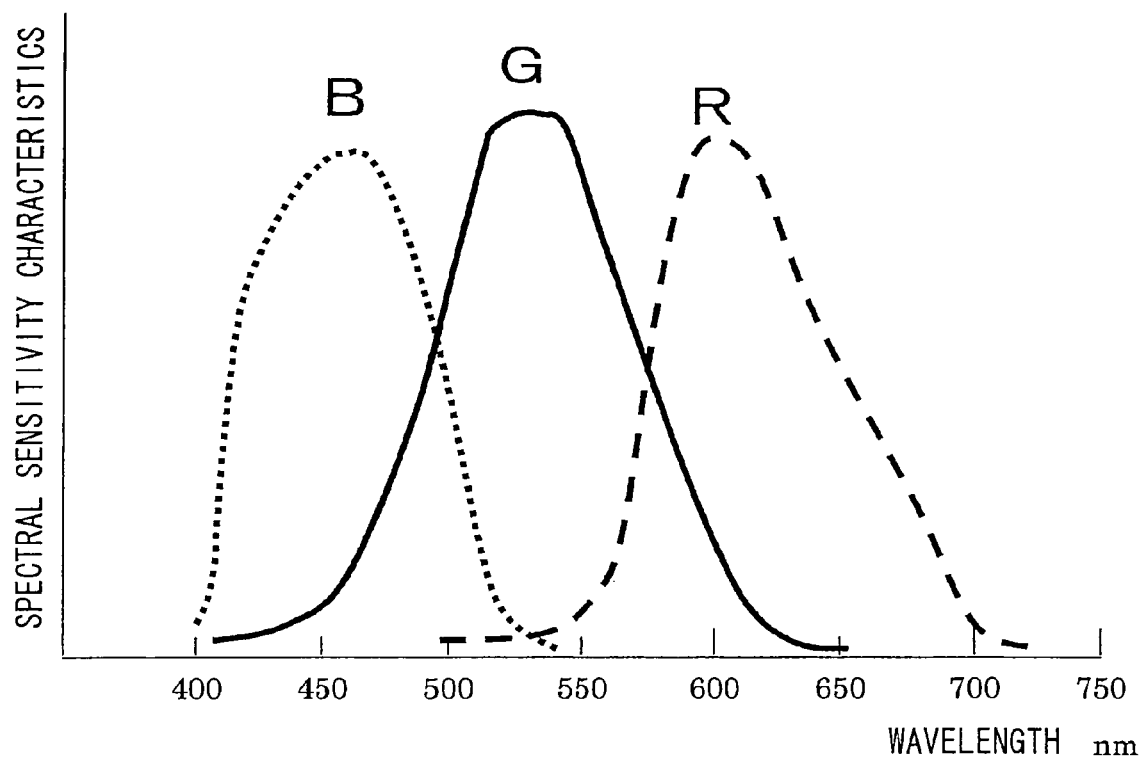
FIG. 28 shows the spectral characteristics of the R, G and B filters.

Each imaging pixel 310 includes a color filter assuming the R spectral sensitivity characteristics, the G spectral sensitivity characteristics or the B spectral sensitivity characters shown in FIG. 28. In FIG. 27, imaging pixels 310R equipped with red filters are each indicated by the letter "R", imaging pixels 310G equipped with green filters are each indicated by the letter "G" and imaging pixels 310B equipped with blue filters are each indicated by the letter "B". The three different types of imaging pixels 310R, 310G and 310B are disposed in a Bayer array. In the following description, the imaging pixels 310R, 310G and 310B are respectively referred to as red pixels 310R, green pixels 310G and blue pixels 310B. The focus detection pixels 313 and 314 are alternately disposed side-by-side along the horizontal direction in a row that would otherwise be occupied by blue pixels 310B and green pixels 310G.

It is desirable that the order in which pixel signals are read out through a sub-sampling read either along the horizontal direction or the vertical direction match the order in which the red pixels 310R, the green pixels 310G and the blue pixels 310B are disposed in the Bayer array, as shown in FIG. 27. For instance, pixel signals should be read out by skipping an even number of rows, e.g., pixel signals may be read out from the first, fourth, seventh . . . rows or from the first, sixth, eleventh . . . rows, since rows with green pixels 310G and blue pixels 310B disposed therein and rows with red pixels 310R and green pixels 310G disposed therein are set alternately to each other in the Bayer array. Likewise, pixel signals should be read out by skipping an even number of columns, e.g., pixel signals may be read out from the first, fourth, seventh . . . columns or from the first, sixth, eleventh . . . columns. The same principle applies when both rows and columns are skipped for sub-sampling read.

It is to be noted that, while the red pixels 310R, the green pixels 310G and the blue pixels 310B are disposed in a Bayer array in the image sensor shown in FIG. 27, color filters adopting a structure and an array other than those at the image sensor may be used in conjunction with the present invention. For instance, an image sensor that includes complementary color filters, may be used. While the focus detection pixels 313 and 314 in the image sensor shown in FIG. 3 are not equipped with color filters, the present invention may be adopted in conjunction with focus detection pixels equipped with color filters, the color of which matches one of the colors of the color filters at the imaging pixels 310 (e.g., green filters).

Variations

Figure 29:
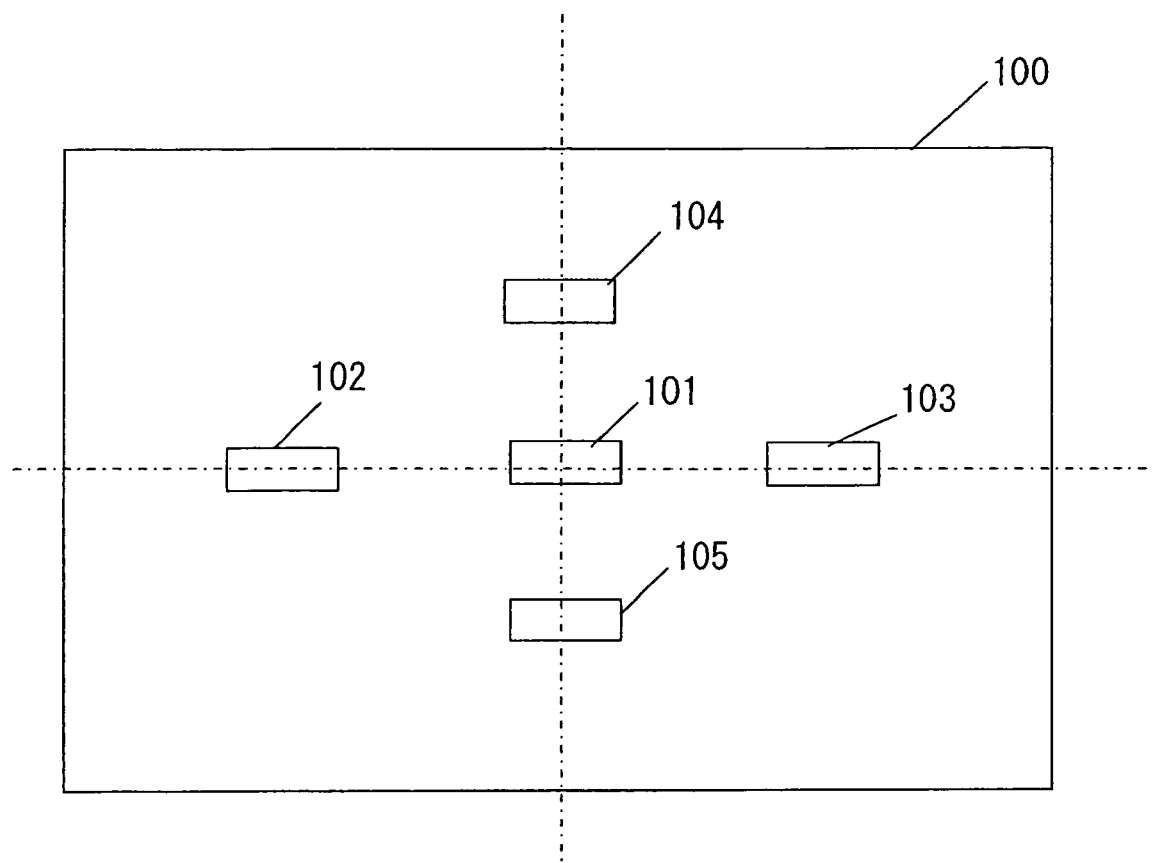
FIG. 29 shows a plurality of focus detection areas 101~105 that may be set at the image sensor 212.

In the embodiments described above, a single focus detection area 101 is set at the center of the photographic image plane, as shown in FIG. 2. However, the present invention is not limited to this example and focus detection areas 102~105 may be set at positions other than the center of the image plane, as shown in FIG. 29. In addition, while an explanation is given above in reference to the embodiments on an example in which the focus detection pixels are disposed side-by-side along the horizontal direction, the present invention may be adopted equally effectively in conjunction with focus detection pixels disposed side-by-side along the vertical direction.

While sub-sampling reads are executed both along the vertical direction and the horizontal direction in the live view display mode in the embodiments described above, the present invention may be adopted in vertical and horizontal sub-sampling reads executed during a photographing operation in a movie mode, to capture dynamic images while detecting the focusing condition.

In the embodiments described above, the first field scanned to read out the pixel signals, as shown in FIG. 20A, and the second field scanned to readout the pixel signals, as shown in FIG. 20B, are distinguished from each other in step S322 in FIG. 17 based upon an ID signal generated from the control circuit built into the image sensor when displaying an image at the liquid crystal display element 216. However, a fixed ID signal may be generated so as to read out the second field pixel signals invariably when displaying an image at the liquid crystal display element 216.

In such a case, an image will be displayed at the liquid crystal display element 216 in step S320 in FIG. 17, based upon the pixel signals from the rows scanned through the sub-sampling read. Namely, in FIG. 20B, the row 911 with the focus detection pixels 313 and 314 disposed therein, instead of the row 910 above the row 911 with the focus detection pixels 313 and 314, is read, and pixel signals equivalent to those in the row 910 is generated through interpolation by adding and averaging the pixel signals read from the matching columns in the rows 912 and 913 set on the two sides of the row where the focus detection pixels 313 and 314 are present. Then, an image is displayed at the liquid crystal display element 216 based upon the pixel signals in the rows having been read through the second field read and the interpolated pixel signals.

While the focus detection pixels 313 and 314 each include a photoelectric conversion unit assuming a semicircular shape, as shown in FIG. 5, the photoelectric conversion units may assume a shape other than this. For instance, the photoelectric conversion units in the focus detection pixels may assume an elliptical shape, a rectangular shape, a polygonal shape or the like. While the image sensor 212 in FIG. 3 assumes a dense square grid array of imaging pixels 310 and focus detection pixels 313 and 314, the image sensor may instead assume a dense hexagonal grid array.

The image capturing device according to the present invention may be embodied as a device other than a digital still camera or a film still camera constituted with an interchangeable lens and a camera body. For instance, the present invention may be adopted in a digital still camera or a film still camera with an integrated lens. It may also be adopted in a video camera, a compact camera module built into a portable telephone or the like, a surveillance camera, an on-vehicle camera or a visual recognition device used in robotics applications. The present invention may be further adopted in a focus detection device installed in a device other than a camera, a range-finding device or a stereo range-finding device.

The above described embodiments are examples and various modifications can be made without departing from the scope of the invention.

What is claimed is:

1. An image sensor, comprising:
   a plurality of first pixels that receive a light flux having passed through an optical system and output pixel signals to be used as image signals;
   a plurality of second pixels that receive a light flux having passed through the optical system and output pixel signals to be used as signals other than the image signals;
   a plurality of first pixel rows, each of the first pixel rows including an array of the first pixels;
   at least one second pixel row that includes an array of the first pixels and the second pixels;
   an output circuit that outputs a read signal in response to which pixel signals output at the first pixels are read out from the first pixel rows over first pixel intervals and pixel signals output at the second pixels are read out from the second pixel row over second pixel intervals, the second pixel intervals being different from the first pixel intervals and the output circuit outputting the pixel signals that have been read out; and
   a switching device that selects a specific pixel row from which pixel signals are to be read out by the output circuit, the specific pixel row being either one of the first pixel rows or the second pixel row.

2. An image sensor according to claim 1, further comprising:
- a selector that selects a circuit for manipulating the read signal based upon the specific pixel row from which the output circuit is to read out pixel signals; and
- line memories that read out and hold pixel signals from each of the first pixel rows and the at least one second pixel row.

3. An image sensor according to claim 1, wherein:
- the light flux is received by the first pixels after passing substantially over an entire range of a pupil of the optical system, and
- the light flux is received by the plurality of second pixels after passing over a partial area of the pupil of the optical system.

4. An image sensor according to claim 1, wherein:
- the second pixels are focus detection pixels each equipped with a micro lens and a first photoelectric conversion unit that receives the light flux via the micro lens, and
- first focus detection pixels and second focus detection pixels that receive light fluxes having passed through different partial areas of the pupil are disposed alternately to each other.

5. An image sensor according to claim 2, wherein:
- the output circuit comprises a first output circuit and a second output circuit, the first output circuit outputting a first read signal and the second output circuit outputting a second read signal to the line memories, and
- the selector selects either the first output circuit or the second output circuit depending upon the specific pixel row selected by the switching device.

6. An image sensor according to claim 2, further comprising:
- a signal line through which the read signal is output from the output circuit to the line memories, wherein:
- the selector selects the signal line in order to manipulate the read signal into a first read signal or a second read signal, the second read signal having cycles different from cycles of the first read signal, depending upon the specific pixel row selected by the switching device.

7. An image sensor according to claim 2, wherein:
- the selector changes cycles of the read signal when the output circuit reads out pixel signals from the second pixel row.

8. An image sensor according to claim 2, wherein:
- pixel signals at the first pixels are read out sequentially over predetermined pixel intervals set as the first pixel intervals when a first read signal is input to the line memories, and pixel signals at the second pixels set in succession are sequentially read out consecutively with no pixel intervals set as the second pixel intervals when a second read signal is input to the line memories, and the output circuit externally outputs the pixel signals thus read out.

9. An image-capturing device, comprising:
- an image sensor according to claim 1;
- a read circuit that cyclically reads out the pixel signals output from the output circuit;
- a display controller that displays an image based upon pixel signals having been first read out from the first pixel rows by the output circuit in response to the read signal and then read out by the read circuit; and
- a focus detector that detects a focusing condition of the optical system based upon pixel signals having been first read out from the at least one second pixel row by the output circuit in response to the read signal and then read out by the read circuit.

10. An image-capturing device according to claim 9, wherein:
- the display controller generates image signals at positions occupied by the second pixels through interpolation that is executed based upon pixel signals output from the first pixels near the second pixels.

11. An image-capturing device according to claim 9, further comprising:
- a focus adjuster that executes focus adjustment for the optical system based upon the focusing condition.

12. An image sensor, comprising:
- a plurality of first pixels that receive a light flux having passed through an optical system and output pixel signals to be used as image signals;
- a plurality of second pixels that receive a light flux having passed through the optical system and output pixel signals to be used as signals other than image signals;
- a plurality of first pixel rows, the plurality of first pixel rows each including an array of the plurality of first pixels;
- at least one second pixel row that includes an array of the plurality of first pixels and the plurality of second pixels and is set among the plurality of first pixel rows;
- an output circuit that has a first read mode and a second read mode, wherein:
- the output circuit outputs pixel signals at the first pixels, the pixel signals at the first pixels being obtained in specific first pixel rows over predetermined row intervals among a plurality of pixel rows in the first read mode; and
- the output circuit outputs pixel signals at the first pixels and the second pixels, the pixel signals at the first pixels and the second pixels being obtained by replacing at least one of the specific first pixel rows with the second pixel row, in the second read mode.

13. An image-capturing device, comprising:
- an image sensor according to claim 12;
- a read circuit that cyclically reads out the pixel signals output from the output circuit;
- a display controller that displays an image based upon pixel signals at the first pixels read out by the read circuit; and
- a focus detector that detects a focusing condition of the optical system based upon pixel signals at the second pixels read out by the read circuit, wherein:
- the output circuit is invariably engaged in the second read mode in response to an image display instruction.

14. An image-capturing device according to claim 13, wherein:
- the display controller generates image signals at positions occupied by the second pixels through an interpolation that is executed based upon pixel signals output from the first pixels near the second pixels.

* * * * *